(12) United States Patent
Park et al.

(10) Patent No.: US 10,613,813 B2
(45) Date of Patent: Apr. 7, 2020

(54) METHOD FOR PROVIDING CONTENT INFORMATION AND ELECTRONIC DEVICE THEREFOR

(71) Applicant: Samsung Electronics Co., Ltd., Suwon-si, Gyeonggi-do (KR)

(72) Inventors: Sangho Park, Anyang-si (KR); Jin Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 15/190,700

(22) Filed: Jun. 23, 2016

(65) Prior Publication Data

US 2017/0109119 A1     Apr. 20, 2017

(30) Foreign Application Priority Data

Oct. 14, 2015   (KR) .................. 10-2015-0143420

(51) Int. Cl.
| | | |
|---|---|---|
| *G06F 3/14* | (2006.01) | |
| *H04N 7/14* | (2006.01) | |
| *G09G 5/14* | (2006.01) | |
| *G06F 3/048* | (2013.01) | |
| *G09G 5/00* | (2006.01) | |
| *G09G 5/12* | (2006.01) | |
| *H04M 1/725* | (2006.01) | |

(52) U.S. Cl.
CPC ............ *G06F 3/1454* (2013.01); *G06F 3/048* (2013.01); *G06F 3/14* (2013.01); *G09G 5/005* (2013.01); *G09G 5/12* (2013.01); *G09G 5/14* (2013.01); *H04N 7/147* (2013.01); *G09G 2354/00* (2013.01); *H04M 1/7253* (2013.01); *H04M 2250/16* (2013.01)

(58) Field of Classification Search
None
See application file for complete search history.

(56) References Cited

U.S. PATENT DOCUMENTS

| | | |
|---|---|---|
| 7,587,080 B1 | 9/2009 | Good |
| 8,375,283 B2 | 2/2013 | Fei et al. |
| 2006/0002315 A1 | 1/2006 | Theurer et al. |
| 2011/0283334 A1 | 11/2011 | Choi et al. |
| 2013/0073965 A1 | 3/2013 | Sik et al. |

(Continued)

FOREIGN PATENT DOCUMENTS

| | | |
|---|---|---|
| KR | 10-2011-0107058 A | 9/2011 |
| KR | 10-2015-0099673 A | 9/2015 |
| KR | 10-2015-0112789 A | 10/2015 |

OTHER PUBLICATIONS

European Search Report dated Oct. 2, 2018 issued in EP Application 16855609.0.

(Continued)

*Primary Examiner* — Brian M Butcher
(74) *Attorney, Agent, or Firm* — Jefferson IP Law, LLP

(57) ABSTRACT

An electronic device and a method for sharing content information are provided. An operation method of the electronic device includes displaying a content on a display of the electronic device, selecting at least a part of the area of the display, and transmitting to an external device, a part of the content displayed in a part of the area of the display such that the transmitted content is controlled through a display of the external device independently of the content displayed on the display. Other embodiments are also disclosed.

14 Claims, 22 Drawing Sheets

(56) References Cited

U.S. PATENT DOCUMENTS

2013/0132862 A1   5/2013   Noel et al.
2013/0290872 A1  10/2013   Hong et al.
2014/0181691 A1   6/2014   Poornachandran et al.
2015/0116391 A1   4/2015   Murugesan et al.
2015/0244853 A1   8/2015   Shin et al.
2015/0281394 A1  10/2015   Raja et al.

OTHER PUBLICATIONS

European Office Action dated Apr. 5, 2019, issued in European Patent Application No. 16855609.0.
European Summons to attend oral proceedings dated Dec. 2, 2019, issued in European Patent Application No. 16 855 609.0.

METHOD FOR PROVIDING CONTENT INFORMATION AND ELECTRONIC DEVICE THEREFOR

CROSS-REFERENCE TO RELATED APPLICATION(S)

This application claims the benefit under 35 U.S.C. § 119(a) of a Korean patent application filed on Oct. 14, 2015 in the Korean Intellectual Property Office and assigned Serial number 10-2015-0143420, the entire disclosure of which is hereby incorporated by reference.

TECHNICAL FIELD

The present disclosure relates to an electronic device and a method for sharing at least some of content displayed.

BACKGROUND

With the development of information and communication and semiconductor technologies, various types of electronic devices have developed into multimedia devices that provide various multimedia services. For example, portable electronic devices may provide various multimedia services such as broadcast services, wireless Internet services, camera services, and music playback services.

An electronic device may share content information with at least one external device connected by wire or wirelessly with communication. For example, an electronic device may output a screen of an application supporting a multi-display function on an external display device in an extended mode.

The above information is presented as background information only to assist with an understanding of the present disclosure. No determination has been made, and no assertion is made, as to whether any of the above might be applicable as prior art with regard to the present disclosure.

SUMMARY

When an electronic device shares content information with an external device, using a particular application, the electronic device may have a problem in which content information of another application or standby screen is unable to be shared with the external device. In addition, an electronic device may have a problem in which even unnecessary information other than some of information of content to be shared, using a particular application, with an external device is shared with the external device.

Aspects of the present disclosure are to address at least the above-mentioned problems and/or disadvantages and to provide at least the advantages described below. Accordingly, an aspect of the present disclosure is to provide an electronic device and a method for sharing at least some of information of content.

Another aspect of the present disclosure is to provide an electronic device and a method for controlling shared content information displayed in an external device.

In accordance with an aspect of the present disclosure, an electronic device is provided. The electronic device includes a display comprising a display area, a communication interface, and a processor, wherein the processor may be configured to, select at least a part of the display area, control the display to display a content on at least the part of the display area, and transmit at least a part of the displayed content to an external device through the communication interface such that the transmitted content is controlled, through a display of the external device, independently of the content displayed on the display.

In accordance with another aspect of the present disclosure, an electronic device is provided. The electronic device includes a display comprising a display area, a communication interface, and a processor, wherein the processor may be configured to, control the display to display a content on the display area, select at least a part of the display area, and transmit at least a part of the content displayed in the selection part of the display area to an external device through the communication interface such that the transmitted content is controlled, through a display of the external device, independently of the content displayed on the display.

In accordance with another aspect of the present disclosure, an operation method of an electronic device is provided. The operation method includes the operations of selecting at least a part of the display area of a display of the electronic device, displaying a content in at least the part of the display area, and transmitting, to an external device, at least a part of the displayed content such that the transmitted content is controlled, through a display of the external device, independently of the content displayed on the display.

In accordance with another aspect of the present disclosure, an operation method of an electronic device is provided. The operation method includes the operations of displaying a content on s display area of a display of the electronic device, selecting at least a part of the display area, and transmitting, to an external device, at least a part of the content displayed in the selection part of the display area such that the transmitted content is controlled, through a display of the external device, independently of the content displayed on the display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
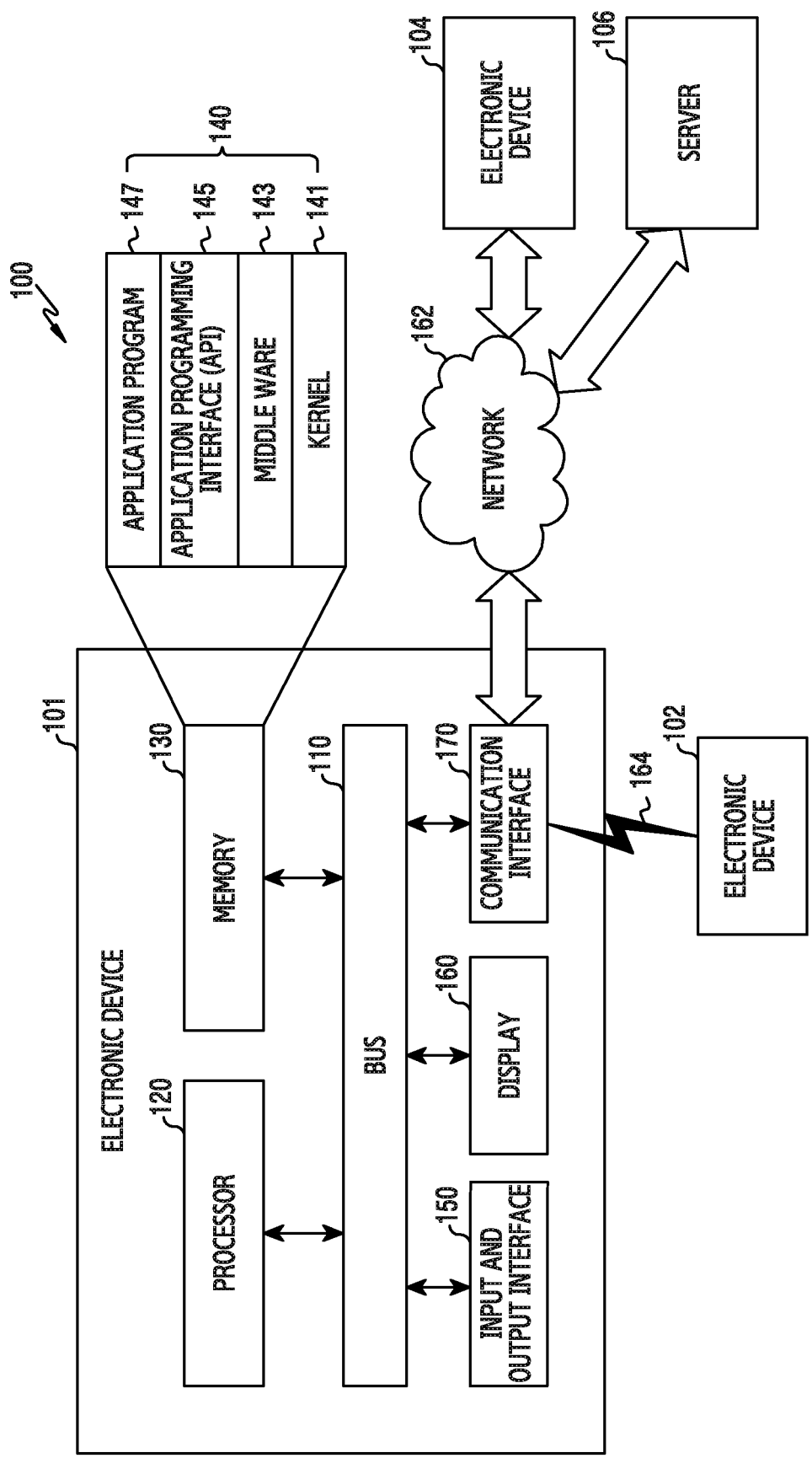
FIG. 1 illustrates an electronic device within a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, operations, elements, parts, or a combination thereof described in the specifications, and do not preclude the presence or addition of one or more other features, numbers, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may be a smart home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Hereinafter, in various embodiments of the present disclosure, a content may include data that is output through an output device of an electronic device, such as a web page, a multimedia image, a wallpaper, voice data, a preview image acquired through a camera, and the like.

FIG. 1 illustrates an electronic device 101 in a network environment 100 according to an embodiment of the present disclosure.

Referring to FIG. 1, the electronic device 101 may include a bus 110, a processor 120 (e.g., including processing circuitry), a memory 130, an input/output interface 150 (e.g., including input/output circuitry), a display 160 (e.g., including a display panel and display circuitry), and a communication interface 170 (e.g., including communication circuitry). In some embodiments, the electronic device 101 may omit at least one of the above elements or may further include other elements.

The bus 110 may include, for example, a circuit that interconnects the components 120 to 170 and delivers communication (for example, a control message and/or data) between the components 120 to 170.

The processor 120 may include one or more of a CPU, an AP, and a communication processor (CP). For example, the processor 120 may carry out operations or data processing relating to control and/or communication of at least one other element of the electronic device 101.

According to an embodiment, a processor 120 may configure a shared area when an occurrence of an event with respect to shared service activation is detected. For example, the processor 120 may control a display 160 to display shared service control information (e.g., a shared service configuration window) when an external device including a display function is connected through a communication interface 170. The processor 120 may perform a control to configure a shared area for content sharing when an input for shared service activation is detected through shared service control information displayed on the display 160. For example, the processor 120 may identify whether a display function of the external device is provided, based on driver information of the external device physically connected with the communication interface 170. For example, the processor 120 may identify whether an input corresponding to the event with respect to shared service activation is detected. For example, the input corresponding to the event with respect to shared service activation may include an icon selection, a gesture input, and so on.

According to an embodiment, the processor 120 may perform a control such that content information displayed on the display 160 is shared with an external device (e.g., an external display device). For example, the processor 120 may extract information on at least one content displayed within a shared area in the display 160. The processor 120 may control the communication interface 170 to transmit, to the external device, information on at least one content displayed within the shared area. The processor 120 may extract information on at least a part of a content displayed within the shared area in the display 160. The processor 120 may control the communication interface 170 to transmit, to the external device, information on at least a part of a content displayed within the shared area. For example, the processor 120 may control a memory 130 such that shared information transmitted to the external device through the communication interface 170 is stored. For example, shared information may include information on at least one content or information on at least a part of a content, which are transmitted to the external device by the electronic device 101.

According to an embodiment, the processor 120 may capture display information of a content included in a shared area in the display 160 in order to share content information displayed on the display 160 with an external device. For example, the processor 120 may capture, in units of frames, information on a content displayed in the shared area in the display 160.

According to an embodiment, the processor 120 may extract at least one of a content included in a shared area in order to share content information displayed on the display 160 with an external device, display information of the content, application information corresponding to the content, and driving information of the content. For example, driving information of the content may include data, such as a link address, a video file, and an image, driven by an application corresponding to the content.

According to an embodiment, the processor 120 may control the communication interface 170 such that a control user interface (UI) corresponding to shared information is transmitted to an external device for content sharing. For example, the processor 120 may generate or update a control UI corresponding to a corresponding content or shared information, based on at least one of the characteristics of the content included in a shared area and the characteristics of the external device for sharing the content. For example, the processor 120 may generate or update a control UI corresponding to each content. The processor 120 may control the display 160 to display the control UI corresponding to the corresponding content or shared information.

According to an embodiment, the processor 120 may control content sharing with an external device, based on shared control information provided by an external device through an input/output interface 150 or the communication interface 170. For example, when the external device has received shard control information requiring previous shared information, the processor 120 may display the same in the external device at a time point for a sharing require by the external device or detect shared information transmitted to the external device in the memory 130. The processor 120 may control the communication interface 170 to transmit the shared information detected in the memory 130 to the external device. In this case, the processor 120 may control the display 160 to display the shared information detected in the memory 130. For example, when the external device has received shard control information requiring previous shared information, the processor 120 may display the same in the external device at a time point for a sharing require by the external device or detect application information corresponding to shared information transmitted to the external device in the memory 130. The processor 120 may control the communication interface 170 to transmit application execution information detected in the memory 130 to the external device. In this case, the processor 120 may control the display 160 to display the application execution information detected in the memory 130. For example, shared control information may include input information corresponding to a control UI, information for controlling a content to be shared (e.g., time point information of sharing a content), and so on.

According to an embodiment, the processor 120 may selectively use an operation scheme for a shared area when a content is shared with an external device. For example, the processor 120 may activate an annotation input operation and deactivate a control operation when the shared area is configured to be in an annotation mode. For example, the annotation input operation may include an input operation which a user can manually hand-write an annotation when a content included in the shared area is shared. The processor 120 may include an input operation corresponding to an input by a user through a touch pen. For example, the processor 120 may activate a control operation and deactivate an annotation input operation when the shared area is configured to be in a control mode. For example, the control operation may include an input operation capable of controlling a user interface within the shared area in response to an input such as a mouse input, a touch input or a key input.

The memory 130 may include a volatile memory and/or a non-volatile memory. The memory 130, for example, may store a command related to at least one other element of the electronic device 101 or data (e.g., a reference distance).

According to an embodiment, the memory 130 may store shared information transmitted to an external device for content sharing. For example, the memory 130 may perform mapping a time point of transmission to the external device and the shared information, and store the same.

According to an embodiment, the memory 130 may store software and/or a program 140. For example, the program may include a kernel 141, middleware 143, an application programming interface (API) 145, or an application program (or "application") 147, and so on. At least some of the kernel 141, the middleware 143, and the API 145 may be referred to as an operating system (OS).

The input/output interface 150 may function as, for example, an interface that may transfer a command or data input from a user or another external device to the other element(s) of the electronic device 101. In addition, the input/output interface 150 may output the command or data received from the other element(s) of the electronic device 101 to the user or another external device. According to an embodiment, the input/output interface 150 may receive a touch using an electronic pen or a part of the user's body, gesture, proximity, or hovering input.

The display 160, for example, may display various types of contents (e.g., a text, an image, a video, an icon, or a symbol) for the user. According to an embodiment, the display 160 may display a shared area to be distinguished from the remaining area. According to an embodiment, the display 160 may display activation information of an annotation mode, using a display parameter of the shared area or an icon. For example, the display parameter may include at least one of color, transparency, shading, and contrast.

The communication interface 170 may configure communication between the electronic device 101 and an external device. For example, the communication interface 170 may be connected to a network 162 through wireless or wired communication to communicate with the external device (e.g., the second external electronic device 104 or the server 106). For example, the communication interface 170 may communicate with the external device (e.g., a first electronic device 102) through short range communication 164 or wired communication. For example, the first external device 102 may include an electronic device supporting a display function.

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. Further, the wireless communication may include, for example, short-range communication. The short-range communication may include at least one of, for example, Wi-Fi, Bluetooth (BT), near field communication (NFC), and global navigation satellite system (GNSS). The GNSS may include at least one of, for example, a GPS, a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a universal serial bus (USB), a high definition multimedia interface (HDMI), Recommended Standard-232 (RS-232, and a plain old telephone service (POTS). The network 162 may include at least one of a communication network such as a computer network (e.g., a local area network (LAN) or a wide area network (WAN)), the Internet, and a telephone network.

Figure 2:
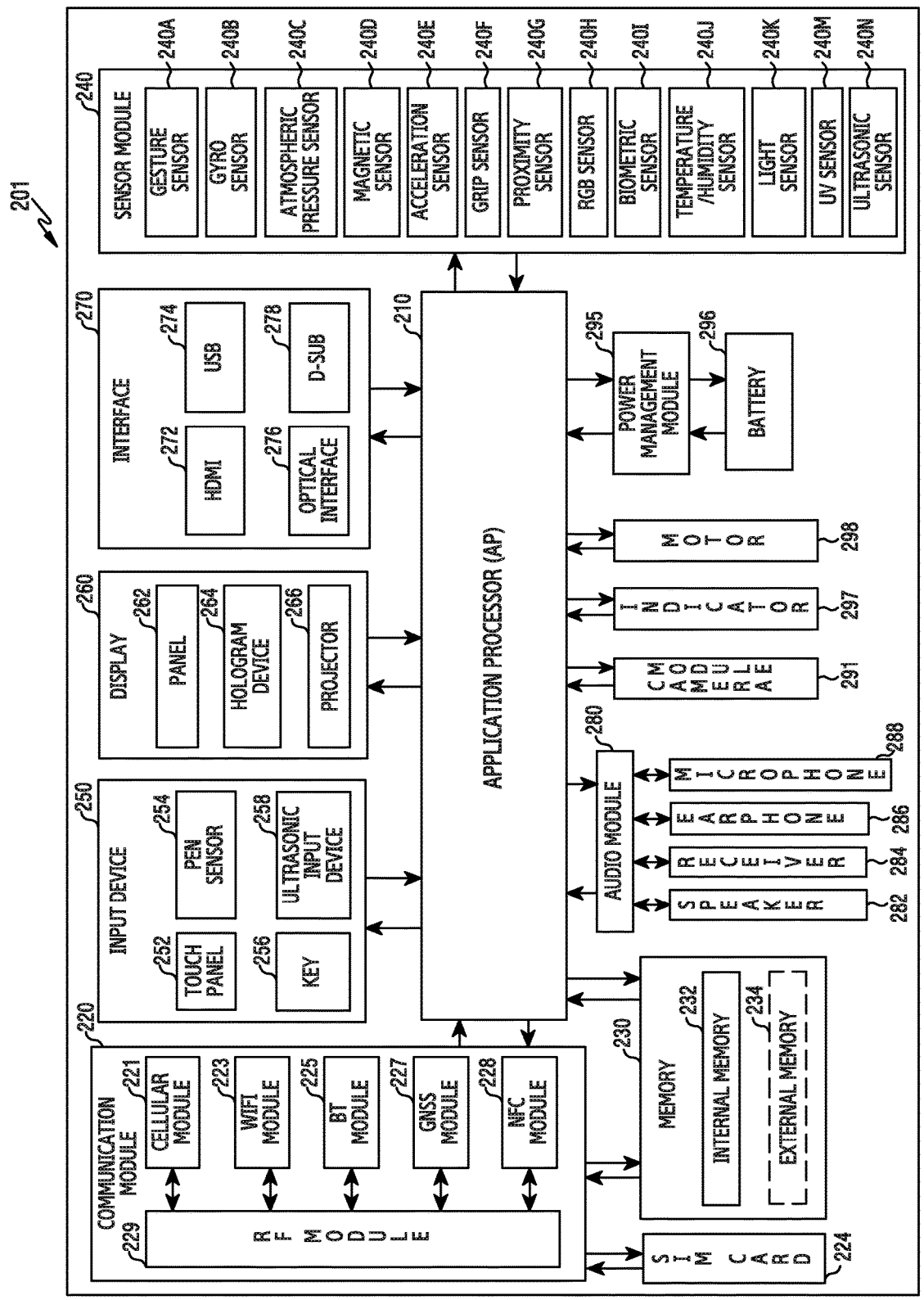
FIG. 2 illustrates a block diagram of an electronic device according to an embodiment of the present disclosure.

FIG. 2 illustrates a block diagram of an electronic device 201 according to an embodiment of the present disclosure.

Referring to FIG. 2, the electronic device 201 may include, for example, all or a part of the electronic device 101 illustrated in FIG. 1. The electronic device 201 may include at least one processor (for example, application processor (AP)) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may, for example, control a plurality of hardware or software elements connected thereto and perform a variety of data processing and calculations by driving an operating system or application programs. The processor 210 may be implemented as, for example, a system on chip (SoC). According to an embodiment, the processor 210 may further include a graphic processing unit (GPU) and/or an image signal processor (ISP). The processor 210 may include at least some of the elements (e.g., a cellular module 221) illustrated in FIG. 2. The processor 210 may load commands or data, received from at least one other element (e.g., a non-volatile memory), in a volatile memory to process the loaded commands or data, and may store various types of data in the non-volatile memory. The processor 210 may load, into a volatile memory, instructions or data received from at least one (for example, a non-volatile memory) of the other elements and may process the loaded instructions or data, and may store various data in a non-volatile memory.

According to an embodiment, the processor 120 may perform a control such that a captured image including at least a part of information of a content is shared with at least one external device.

The communication module 220 may have a configuration equal or similar to that of the communication interface 170 of FIG. 1. The communication module 220 may include, for example, a cellular module 221, a Wi-Fi module 223, a Bluetooth (BT) module 225, a GNSS module 227 (e.g., a GPS module, a Glonass module, a Beidou module, or a Galileo module), an NFC module 228, and a radio frequency (RF) module 229.

The cellular module 221 may provide, for example, an application call, a video call, a text message service, or an Internet service through a communication network. According to an embodiment, the cellular module 221 may distinguish and authenticate the electronic device 201 in the communication network by using a subscriber identification module (e.g., the SIM card 224). According to an embodiment, the cellular module 221 may perform at least some of the functions that the AP 210 may provide. According to an embodiment, the cellular module 221 may include a communication processor (CP).

The Wi-Fi module 223, the BT module 225, the GPS module 227, or the NFC module 228 may include, for example, a processor for processing data transmitted/received through the corresponding module. According to an embodiment, at least some (e.g., two or more) of the cellular module 221, the Wi-Fi module 223, the BT module 225, the GPS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amp module (PAM), a frequency filter, a low noise amplifier (LNA), or an antenna. According to another embodiment, at least one of the cellular module 221, the Wi-Fi module 223, the BT module 225, the GPS module 227, and the NFC module 228 may transmit/receive an RF signal through a separate RF module.

The SIM card 224 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color (RGB) sensor 240H (e.g., red, green, and blue (RGB) sensor), a biometric sensor 240I, a temperature/humidity sensor 240J, an illumination or light sensor 240K, an ultra violet (UV) sensor 240M and an ultrasonic sensor 240N. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment, the electronic device 201 may further include a processor that is configured as a part of the AP 210 or a separate element from the AP 210 in order to control the sensor module 240, thereby controlling the sensor module 240 while the AP 2710 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared (IR) type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 150 illustrated in FIG. 1. The audio module 280 may, for example, process sound information that is input or output through the speaker 282, the receiver 284, the earphones 286, the microphone 288, or the like.

The camera module 291 may be, for example, a device that can take a still image or a moving image, and according to an embodiment, the camera module 291 may include one or more image sensors (e.g., a front sensor or a rear sensor), a lens, an image signal processor (ISP), or a flash (e.g., a light emitting diode (LED) or a xenon lamp).

The power management module 295 may, for example, manage power of the electronic device 201. According to an embodiment, the power management module 295 may include a power management integrated circuit (PMIC), a charger IC, or a battery or fuel gauge. The battery 296 may include, for example, a rechargeable battery or a solar battery.

The indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration or haptic effect.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 3:
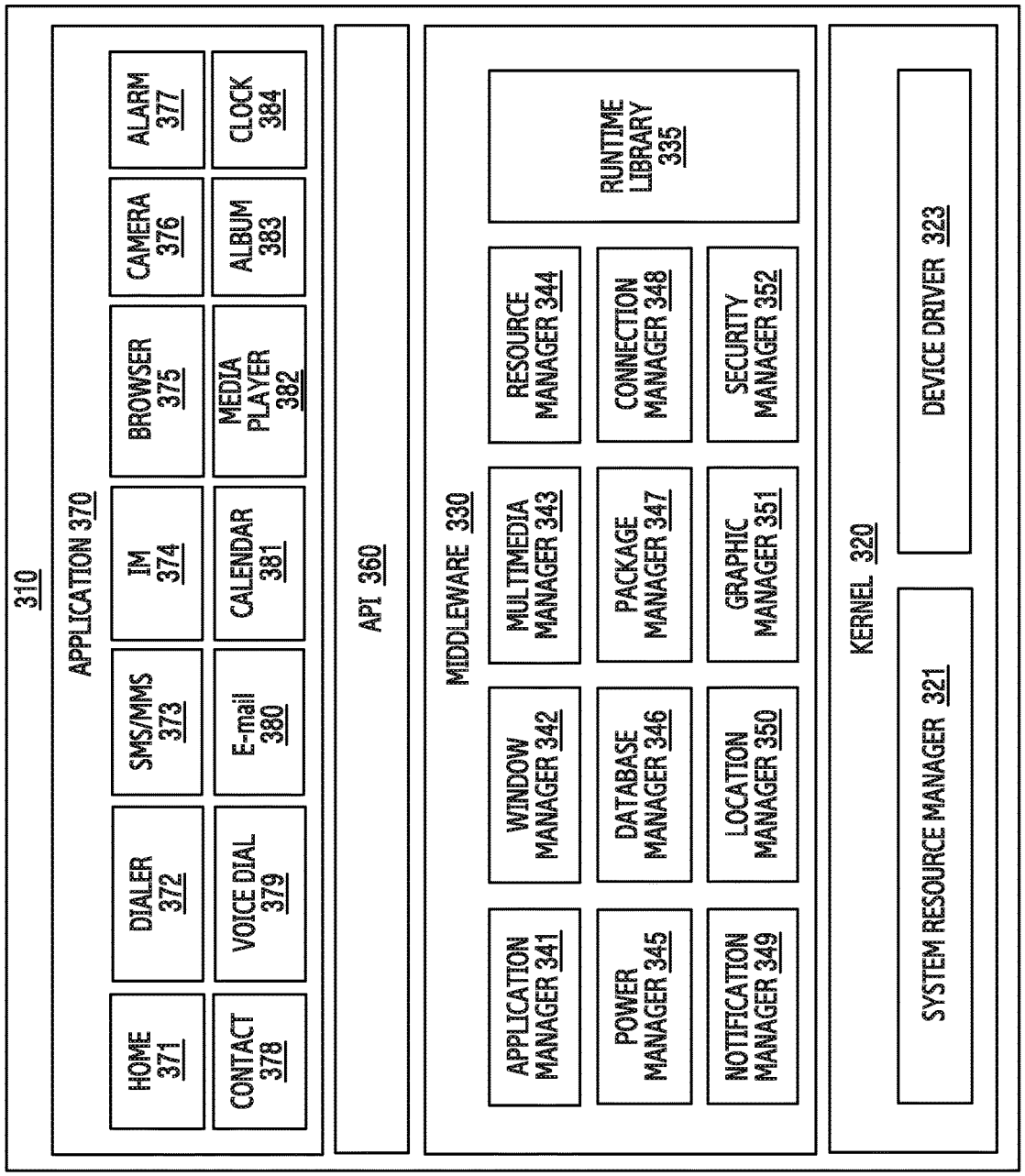
FIG. 3 illustrates a block diagram of a program module according to an embodiment of the present disclosure.

FIG. 3 illustrates a block diagram of a program module 310 according to an embodiment of the present disclosure.

Referring to FIG. 3, the program module 310 (e.g., the program 140) may include an OS that controls resources relating to an electronic device (e.g., the electronic device 101) and/or various applications (e.g., the application 147) executed in the OS. The OS may be, for example, Android, iOS™, Windows™, Symbian™, Tizen™, Bada™, or the like.

The programming module 310 may include a kernel 320, middleware 330, an API 360, and/or applications 370. At least some of the program module 310 may be preloaded in the electronic device, or may be downloaded from an external electronic device (e.g., the electronic device (102, 104), the server 106).

The kernel 320 (e.g., the kernel 141 of FIG. 1) may include, for example, a system resource manager 321 or a device driver 323. The system resource manager 321 may control, allocate, or collect system resources.

The middleware 330 may provide, for example, a function commonly required by the applications 370, or may provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module which a compiler uses in order to add a new function through a programming language while the applications 370 are being executed. The runtime library 335 may perform input/output management, memory management, the functionality for an arithmetic function, or the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources, such as a source code, a memory, a storage space, and the like of at least one of the applications 370.

The power manager 345 may operate together with a basic input/output system (BIOS) to manage a battery or power, and may provide power information required for the operation of the electronic device. According to an embodiment, the power manager 345 may perform a control so that a charge or discharge of a battery is provided through at least one of a wired manner and a wireless manner.

The database manager 346 may generate, search for, or change a database to be used by at least one of the applications 370. The package manager 347 may manage the installation or update of an application distributed in the form of a package file.

The connectivity manager 348 may manage a wireless connection such as, for example, Wi-Fi or BT. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like.

According to an embodiment, when the electronic device (for example, the electronic device 101) has a telephone call function, the middleware 330 may further include a telephony manager for managing an application call function or a video call function of the electronic device.

The middleware 330 may include a middleware module that forms a combination of various functions of the above-described elements. The middleware 330 may provide a specialized module according to each OS in order to provide a differentiated function. Also, the middleware 330 may dynamically delete some of the existing elements, or may add new elements.

The API 360 (for example, the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application programs 147) may include, for example, one or more applications which can provide functions such as a home 371, a dialer 372, a short message service (SMS)/multimedia messaging service MMS 373, an instant message (IM) 374, a browser 375, a camera 376, an alarm 377, contact(s) 378, a voice dialer (Voice Dial) 379, an email (E-mail) 380, a calendar 381, a media player 382, an album 383, a clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device (for example, an SMS/MMS application, an e-mail application, a health care application, or an environmental information application). Further, the notification relay application can, for example, receive notification information from the external electronic device and provide the received notification information to a user.

The device management application may manage (for example, install, delete, or update), for example, at least one function of an external electronic device (for example, the electronic device 102 or 104) communicating with the electronic device (for example, a function of turning on/off the external electronic device itself (or some elements) or a function of adjusting luminance (or a resolution) of the display), applications operating in the external electronic device, or services provided by the external electronic device (for example, a call service and a message service).

According to an embodiment, the applications 370 may include applications (for example, a health care application of a mobile medical appliance) designated according to attributes of the external electronic device (for example, the electronic device 102 or 104). According to an embodiment, the applications 370 may include an application received from the external electronic device (for example, the server 106, or the electronic device 102 or 104). According to an embodiment, the applications 370 may include a preloaded application or a third party application which can be downloaded from the server. Names of the elements of the program module 310 according to the above-illustrated embodiments may change depending on the type of OS.

According to various embodiments, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process, for performing one or more functions.

Figure 4:
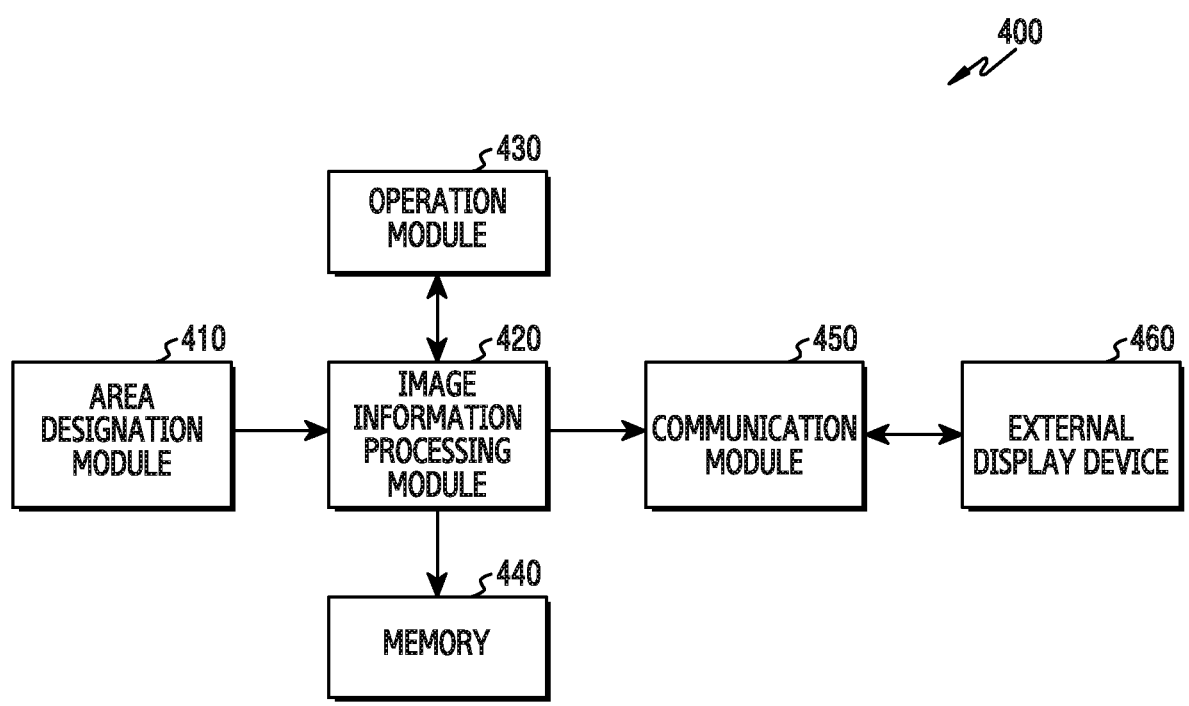
FIG. 4 illustrates a block diagram of an electronic device for sharing a content according to an embodiment of the present disclosure.

FIG. 4 illustrates a block diagram of an electronic device for sharing a content according to an embodiment of the present disclosure. In the description herein below, an electronic device 100 may include the electronic device 101 illustrated in FIG. 1 or the entire or a part of the electronic device 201 illustrated in FIG. 2.

Referring to FIG. 4, the electronic device 400 may include an area designation module 410 (e.g., including area designation circuitry), an image information processing module 420 (e.g., including image information processing circuitry), an operation module 430 (e.g., including operation circuitry), a memory 440, and a communication module 450 (e.g., including communication circuitry).

According to an embodiment, the area designation module 410 may configure a shared area for displaying a content to be shared with an external device when a shared service is activated. For example, the area designation module 410 may execute a shared application and control a display (e.g., the display 160) to display a shared area having a reference size when a shared service is activated. The area designation module 410 may update the size of the shared area based on input information detected through an input/output interface (e.g., the input/output interface 150).

According to an embodiment, the image information processing module 420 may capture content display information displayed in shared area information provided by the area designation module 410, and generate shared information. For example, the shared area information may include coordinate information of the shared area.

According to an embodiment, the image information processing module 420 may extract information on a content included in a shared area provided by the area designation module 410 through the operation module 430, and generate shared information. For example, the image information processing module 420 may transmit shared area information to the operation module 430. The image information processing module 420 may receive information on a content included in the shared area from the operation module 430. For example, information on the content may include at least one of the content, content display information, application information corresponding to the content, and content driving information.

According to an embodiment, the image information processing module 420 may change the period of performing capture included in a shared area, on the basis of information on a content provided through the operation module 430. For example, the image information processing module 420 may configure or change the period of performing capture to be relatively fast (e.g., about 10 ms) in case of a video content. For example, the image information processing module 420 may configure or change the period of performing capture to be relatively slow (e.g., about 1 sec) in case of a text content.

According to an embodiment, the image information processing module 420 may configure a control UI corresponding to shared information included in a shared area. For example, the image information processing module 420 may generate or update a control UI corresponding to a corresponding content or shared information, based on at least one of the characteristics of the content included in a shared area and the characteristics of the external display device 460 for sharing the content. For example, the characteristics of the content may include at least one of a content type, an application type corresponding to the content, and an operation state of the corresponding application. For example, the characteristics of the external display device may include a type, resolution, and location of the external display device.

According to an embodiment, the image information processing module 420 may control a communication module 450 to transmit shared information or shared information and a control UI to an external device. According to an embodiment, the image information processing module 420 may control the memory 440 such that shared information or shared information and a control UI may be mapped to time information and stored.

According to an embodiment, the image information processing module 420 may perform a control to extract shared information corresponding to shared control information of the external display device 460 among the pieces of shared information stored in the memory 440, and provide the extracted shared information to the external display device 460. For example, shared control information of the external display device 460 may include input information for extracting or selecting previous shared information received from the external device through an input/output interface (e.g., the input/output interface 150 in FIG. 1) or the communication module 450.

According to an embodiment, the image information processing module 420 may synchronize the external display device 460 and display information, based on a time point of receiving control information of the external display device 460. For example, the image information processing module 420 may control the communication module 450 to transmit previous shared information or previous shared information and a control UI, which are stored in the memory 440, to a particular external display device 460 when shared control information for requesting a transmission of previous shared information to the particular external display device 460 is detected during content information sharing with at least one external display device 460. The image information processing module 420 may synchronize content sharing of the particular external display device 460 when additional shared control information on the particular external display device 460 is not received during a reference time. For example, the image information processing module 420 may control the communication module 450 such that shared information transmitted to a remaining external display device 460 is also transmitted to the particular external display device 460.

According to an embodiment, the operation module 430 may extract information on a content included in a shared area provided by the image information processing module 420, and transmit the extracted information to the image information processing module 420. For example, the operation module 430 may extract content display information displayed within the shared area through a graphic module included in the operation module 430. For example, the operation module 430 may extract information of an application corresponding to a content displayed within the shared area through an application control module included in the operation module 430.

According to an embodiment, the memory 440 may store a command or data related to an element included in the electronic device 400. For example, the memory 440 may store shared information or shared information and a control UI, which are transmitted to an external device by the image information processing module 420. For example, the memory 440 may perform mapping a time point of transmission to the external device and shared information, and store the same.

According to an embodiment, the communication module 450 (e.g., the communication interface 170 in FIG. 1) may transmit and receive a signal between the electronic device 400 and the external display device 460. For example, the communication module 450 may communicate with the external display device 460 through wireless communication or wired communication. Further, the wireless communication may use, for example, at least one of LTE, LTE-A, CDMA, WCDMA, UMTS, WiBro, and GSM, for example, as a cellular communication protocol. Further, the wireless communication may include, for example, short-range communication. The short range communication, for example, may include at least one of a Wi-Fi (wireless LAN), BT, NFC, Bluetooth low energy (BLE), a GNSS, and so on. A GNSS may include, for example, at least one of a GPS, Glonass, Beidou or Galileo, and the European global satellite-based navigation system, depending on the region for use, bandwidth, or the like. Wired communication may include, for example, at least one of USB, HDMI, RS-232, POTS, and the like.

According to various embodiments of the present disclosure, the processor 120 in FIG. 1 may be configured to perform the entire or at least some of operations of the image information processing module 420, area designation module 410, and operation module 430 in FIG. 4.

According to various embodiments of the present disclosure, an electronic device may include a display, a communication interface, and a processor, wherein the processor may be configured to select at least a part of the area of the display, display a content in at least a part of the area of the display, and transmit at least a part of the content displayed in at least a part of the area of the display to an external device through the communication interface such that the transmitted content is controlled, through a display of the external device, independently of the content displayed on the display.

According to various embodiments, the processor may be configured to transmit, using the communication interface, a user interface for controlling the transmitted content to the external device.

According to various embodiments, the processor may be configured to determine a first user interface as the user interface when the content is a first content, and determine a second user interface as the user interface when the content is a second content.

According to various embodiments, the processor may be configured to determine the user interface for controlling the transmitted content, based on at least one of the content type, an application type corresponding to the content, and an operation state of the application.

According to various embodiments, the processor may be configured to determine the user interface for controlling the transmitted content, by the external device, further based on at least one of a type, resolution, and location of the external device.

According to various embodiments, a memory is further included, and the processor may be configured such that at least a part of the content displayed in at least a part of the area of the display is stored in the memory.

According to various embodiments, the processor may be configured to change a period of storing the content in the memory, based on at least one of the content type, an application type corresponding to the content, and an operation state of the application.

According to various embodiments, the memory may be configured to associate at least a part of the content displayed in at least a part of the area of the display with a time point of transmission to the external device, and store the same.

According to various embodiments, when control information is received, the processor may be configured such that at least a part of a content corresponding to the control information is detected in the memory, and the communication interface transmits at least a part of a content corresponding to the control information to the external device.

According to various embodiments of the present disclosure, the electronic device may include a display, a communication interface, and a processor, wherein the processor may be configured to display a content on the display, select at least a part of the area of the display, and transmit at least a part of the content displayed in at least a part of the area of the display to an external device through the communication interface such that the transmitted content is controlled, through a display of the external device, independently of the content displayed on the display.

Figure 5:
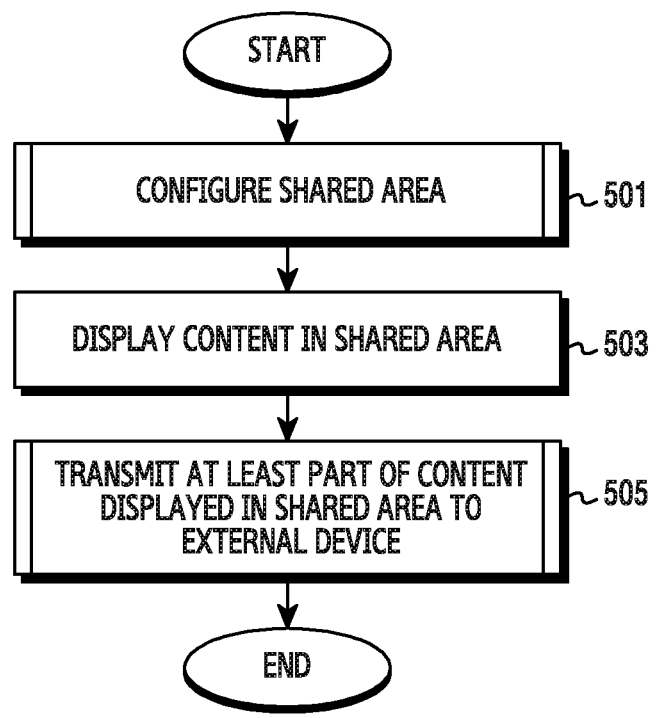
FIG. 5 illustrates a flow diagram of an electronic device for sharing a content according to an embodiment of the present disclosure.

FIG. 5 illustrates a flow diagram of an electronic device for sharing a content according to an embodiment of the present disclosure.

Referring to FIG. 5, in operation 501, an electronic device (e.g., the electronic device 101 or 400) may configure at least a part of the area of a display (e.g., the display 160) as a shared area. For example, the processor 120 (e.g., the area designation module 410) may configure at least a part of the area of the display 160 as a shared area when an input corresponding to a shared service activation event is detected through the input/output interface 150 or a sensor (not shown). For example, the processor 120 may control the display 160 to display a shared service configuration window when an external device including a display function is connected through the communication interface 170. The processor 120 may configure at least a part of the area of the display 160 as a shared area when an input for shared service activation is detected through the shared service configuration window displayed on the display 160.

In operation 503, the electronic device may display a content in at least a part of the area of the display, which configured as a shared area. For example, the processor 120 (e.g., the image information processing module 420) may control the display 160 to display, in the shared area, at least one content selected through the input/output interface 150.

In operation 505, the electronic device may transmit, to an external device, information on at least one content displayed in at least a part of the area of the display, which is configured as a shared area. The electronic device may generate or update, in a new content form, information on at least one content displayed in the shared area such that the content displayed on a display of the electronic device may be independently controlled by the external device. For example, the processor 120 (e.g., the image information processing module 420) may generate, as a new content, information on at least one content included in the shared area, and transmit the same to the external device. For example, the processor 120 may capture content display information displayed in the shared area, and transmit the same to the external device. For example, the processor 120 may extract information on at least one content included in the shared area, and transmit the same to the external device. For example, information on the content may include at least one of the content, content display information, application information corresponding to the content, and content driving information.

Figure 6:
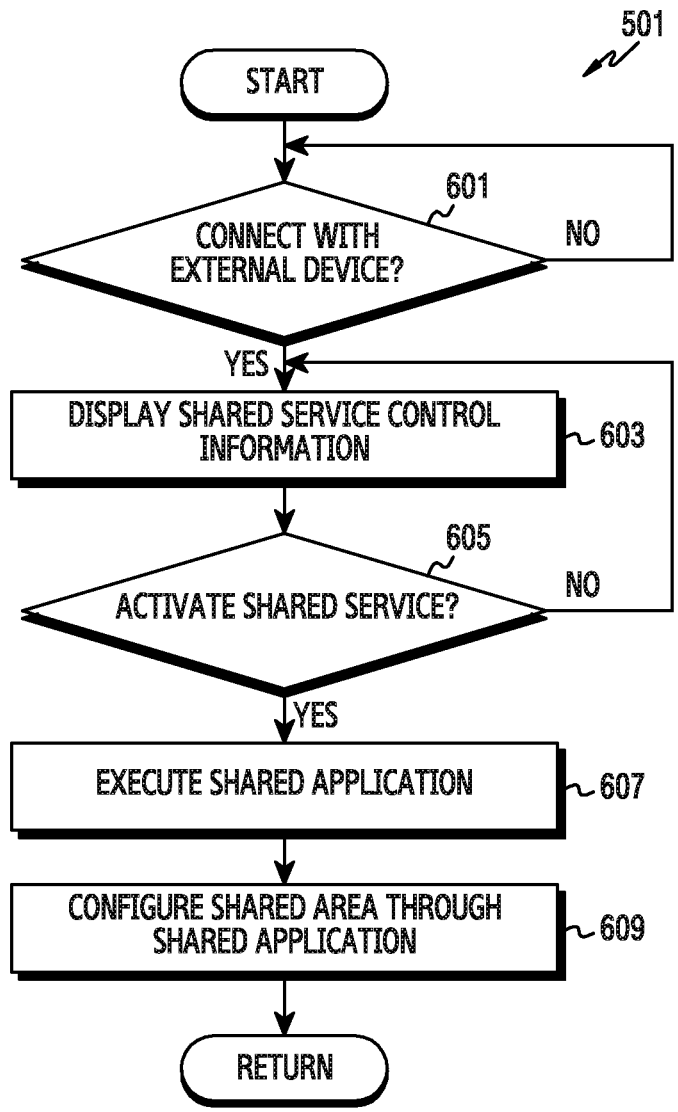
FIG. 6 illustrates a flow diagram of an electronic device for configuring a shared area according to an embodiment of the present disclosure.

FIG. 6 illustrates a flow diagram of an electronic device for configuring a shared area according to an embodiment of the present disclosure. The description herein below relates to the operation for configuring a shared area, in operation 501 of FIG. 5.

Referring FIG. 6, in operation 601, an electronic device (e.g., the electronic device 101 or 400) may identify whether an external device has been connected for communication. For example, the processor 120 may identify whether an external device supporting a display function has been connected through the communication interface 170. For example, the processor 120 may identify whether an external device supports a display function, based on driver information of the external device connected for communication through the communication interface 170.

In operation 603, the electronic device may display shared service control information on at least a part of the area of a display when an external device supporting a display function has been connected for communication. For example, the processor 120 may control the display 160 to display a pop-up window for determining whether a shared service is activated when an external display device (e.g., a first external electronic device 102) has been connected for communication. For example, the pop-up window may include an activation button and deactivation button for the shared service.

In operation 605, the electronic device may identify whether a shared service is activated, using the replay of shared service control information. For example, the processor 120 may identify whether an input of selecting an activation button displayed in the pop-up window that is displayed in the display 160 is detected.

The electronic device may maintain a display of shared service control information when a shared service is not activated, in operation 603. According to an embodiment, the electronic device may determine that a shared service is not provided when an input of selecting a deactivation button is detected in the pop-up window.

In operation 607, the electronic device may execute a shared application when a shared service is activated. For example, the processor 120 may execute a shared application and control the display 160 to display a shared area having a default size when a shared service is activated.

In operation 609, the electronic device may configure a shared area using a shared application. For example, the processor 120 (e.g., the area designation module 410) may update the size of a shared area displayed by a shared application and configure the shared area, based on input information detected through the input/output interface 150.

Figure 7:
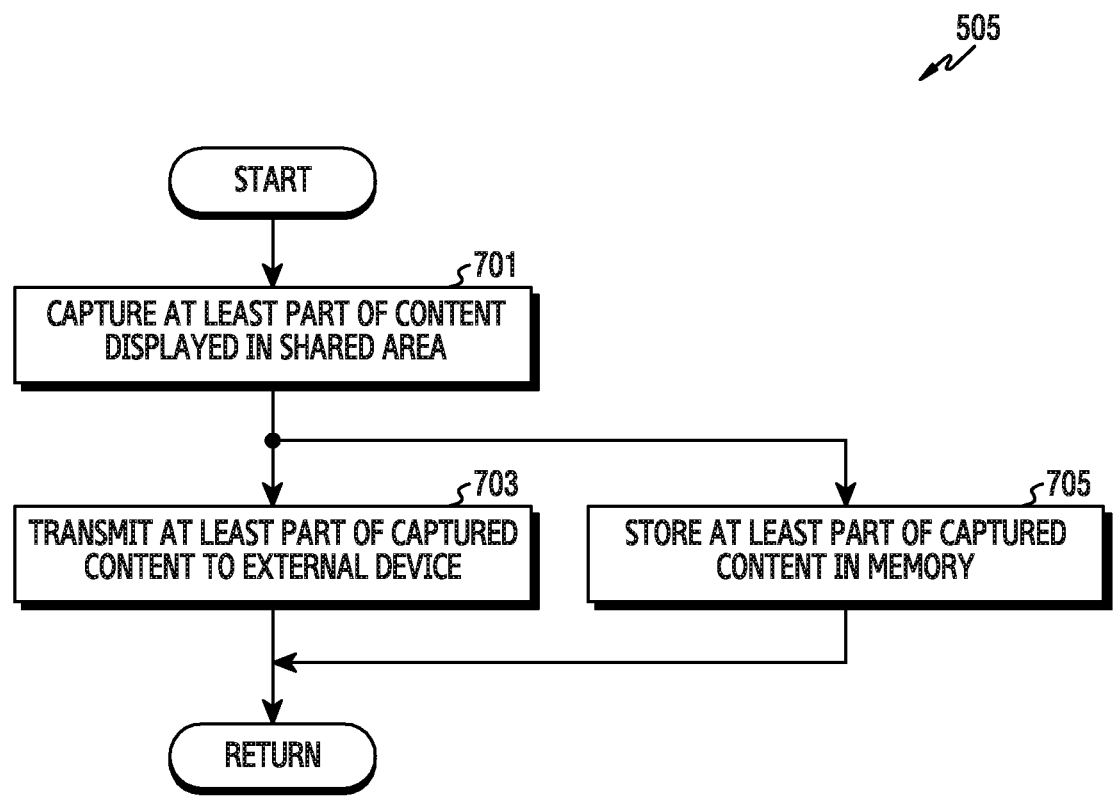
FIG. 7 illustrates a flow diagram of an electronic device for sharing at least a part of a content through screen capturing according to an embodiment of the present disclosure.

FIG. 7 illustrates a flow diagram of an electronic device for sharing at least a part of a content through screen capturing according to an embodiment of the present disclosure. The description herein below relates to the operation for transmitting, to an external device, information on at least a part of a content displayed in a shared area, in operation 505 of FIG. 5.

Referring to FIG. 7, in operation 701, an electronic device (e.g., the electronic device 101 or 400) may capture display data of a content displayed in a shared area. For example, the processor 120 (e.g., the image information processing module 420) may capture, in units of frames, display information of a content displayed in at least a part of the area of the display 160 configured as a shared area.

In operation 703, the electronic device may transmit information on at least a part of the captured content to an external device. For example, the processor 120 (e.g., the image information processing module 420) may generate or update at least a part of the captured content as a new content such that the content displayed on the display 160 is independently controlled by the external device, and transmit the generated or updated content to the external device through the communication interface 170.

In operation 705, the electronic device may store information on at least a part of the captured content in the memory. For example, the processor 120 (e.g., the image information processing module 420) may store information on at least a part of the captured content in the memory 130 such that the stored information is matched with shared time point information.

Figure 8:
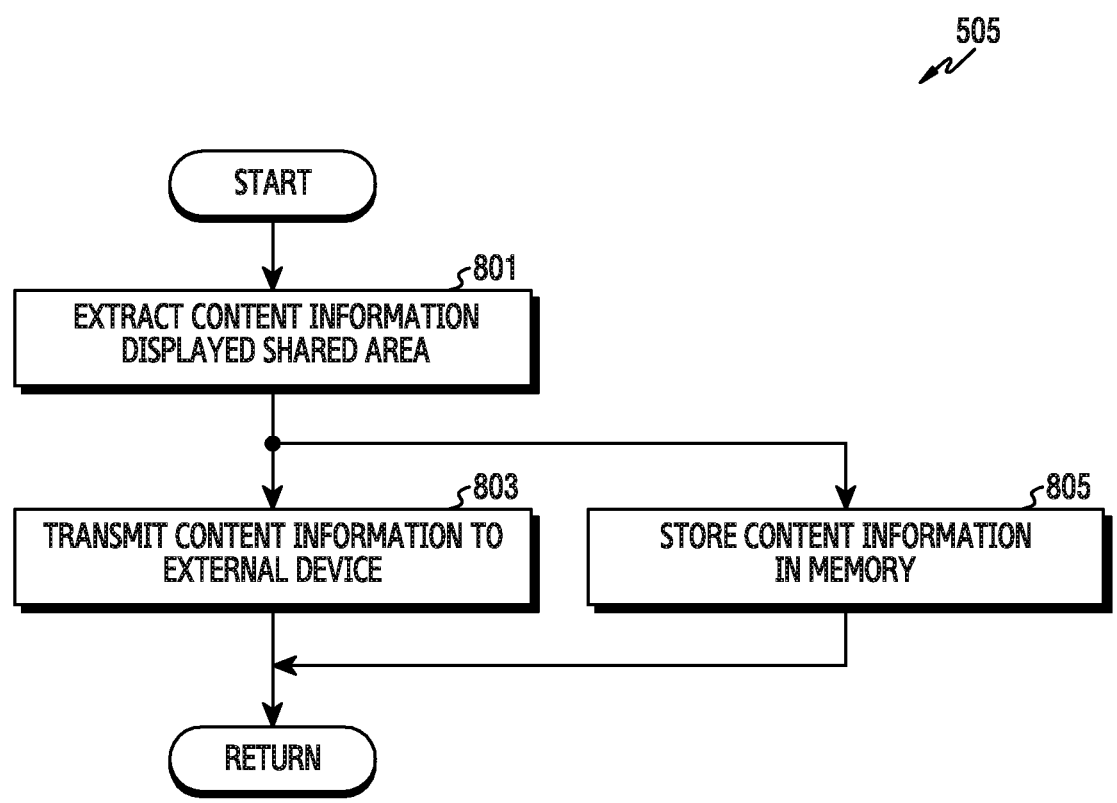
FIG. 8 illustrates a flow diagram of an electronic device for extracting content information displayed in a shared area according to an embodiment of the present disclosure.
Figure 9A:
FIGS. 9A and 9B illustrate a configuration of shared information transmitted to an external device according to an embodiment of the present disclosure.
Figure 9B:
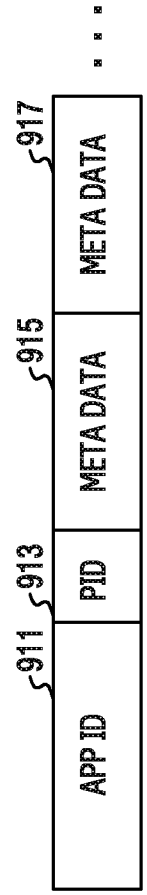

FIG. 8 illustrates a flow diagram of an electronic device for extracting content information displayed in a shared area according to an embodiment of the present disclosure. FIGS. 9A and 9B illustrate a configuration of shared information transmitted to an external device according to an embodiment of the present disclosure. The description herein below relates to the operation for transmitting, to an external device, shared information having the same configuration as that of FIGS. 9A and 9B, in operation 505 of FIG. 5.

Referring to FIG. 8, in operation 801, an electronic device (e.g., the electronic device 101 or 404) may extract information on at least one content included in a shared area. For example, the processor 120 (e.g., the operation module 430) may extract display information of a content displayed in the shared area through a graphic module included in an OS. For example, the graphic module may control, in the OS, an input/output of graphic data and a display of graphic data. For example, the processor 120 may extract information of an application corresponding to the content displayed in the shared area through an application management module of the OS. For example, application information may include at least one of an application type corresponding to a content, an operation state of the corresponding application, and information on the content executed in the shared area through the application.

In operation 803, the electronic device may transmit information on at least one content to an external device. For example, the processor 120 (e.g., the image information processing module 420) may control the communication interface 170 to transmit, to the external device, shared information configured as a form having a shared time point 901, information on a shared area 903, and information of at least one application included in the shared area 905 and 907, as illustrated in the embodiment of FIG. 9A. For example, the processor 120 may control the communication interface 170 to transmit, to the external device, shared information configured as a form having application identification information 911, processor identification information (PID) 913, and meta information 915, 917 of a corresponding application, for each application included in the shared area, as illustrated in the embodiment of FIG. 9B. For example, in case of a web browser, meta information of the application may include uniform resource location (URL) information displayed in a shared area, a web page structure (e.g., an extensible markup language (XML) structure), an address of an image displayed in a shared area, cookie information, text information displayed in a shared area, tag information, and so on. For example, in case of a video application, meta information of the application may include codec information, information on an image being executed through the application (e.g., an image title, an image location, a reproduction time point information), and so on.

In operation 805, the electronic device may store information on at least one content in the memory. For example, the processor 120 may store information on at least one content in the memory 130 such that the stored information is matched with shared time point information. For example, the memory 130 may store shared information as the form in FIGS. 9A and 9B.

Figure 10:
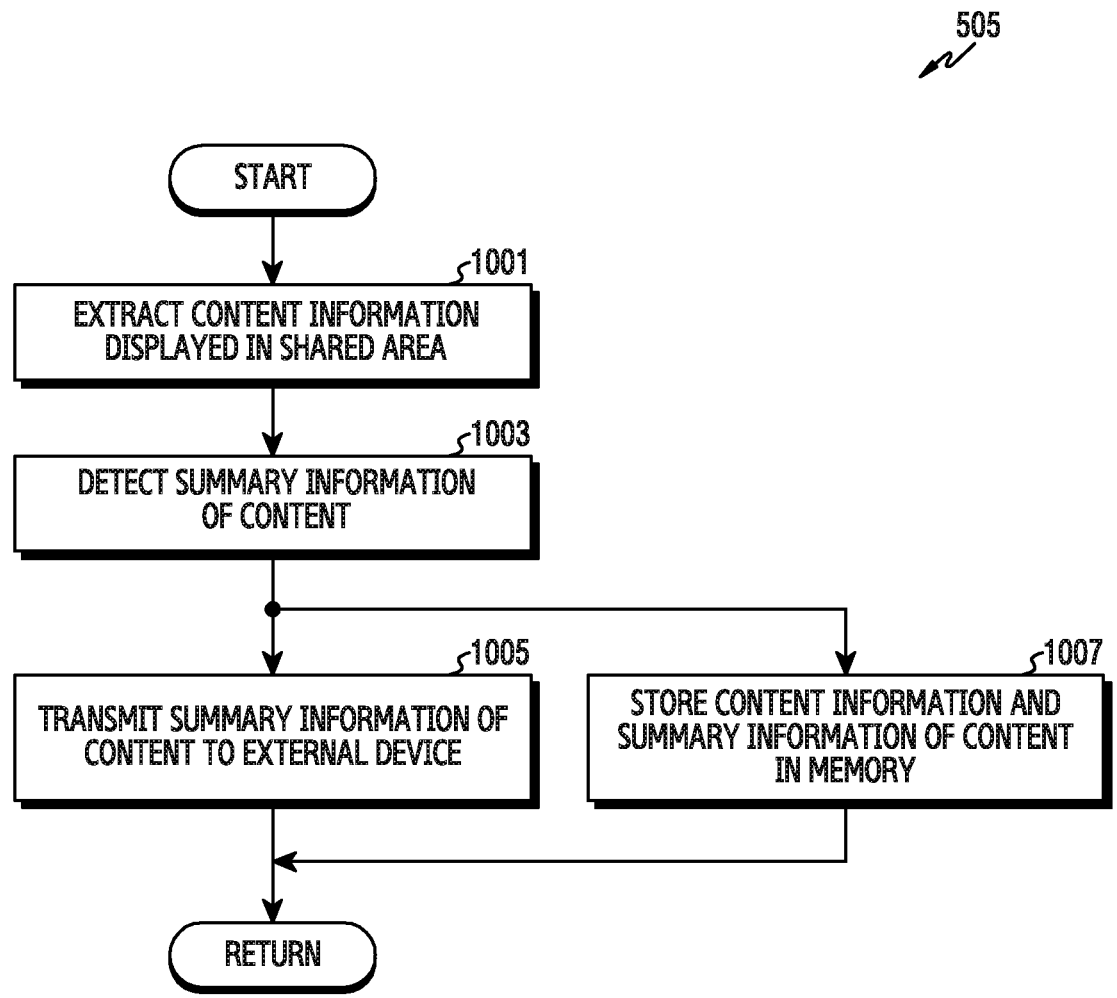
FIG. 10 illustrates a flow diagram of an electronic device performing a transformation for sharing content information displayed in a shared area according to an embodiment of the present disclosure.

FIG. 10 illustrates a flow diagram of an electronic device performing a transformation for sharing content information displayed in a shared area according to an embodiment of the present disclosure. The description herein below relates to the operation for transmitting, to an external device, information on at least a part of a content displayed in a shared area, in operation 505 of FIG. 5.

Referring to FIG. 10, in operation 1001, an electronic device (e.g., the electronic device 101 or 400) may extract information on at least one content included in a shared area. For example, the processor 120 (e.g., the operation module 430) may extract data of a web browser displayed in a shared area through an application management module of an OS.

In operation 1003, the electronic device may detect summary information of at least one content. For example, the processor 120 (e.g., the operation module 430) may generate summary information using text information of a web browser extracted through an application management module of an OS, or extract at least a part of the text information as the summary information.

In operation 1005, the electronic device may transmit summary information of a content to an external device. For example, the processor 120 (e.g., the image information processing module 420) may control the communication interface 170 to transmit, to an external device, summary information of the content detected in operation 1003.

In operation 1007, the electronic device may store information on at least one content and summary information of the content, in the memory. For example, the processor 120 (e.g., the image information processing module 420) may match at least one content and summary information of the content with shared time point information, and store the same in the memory 130.

Figure 11:
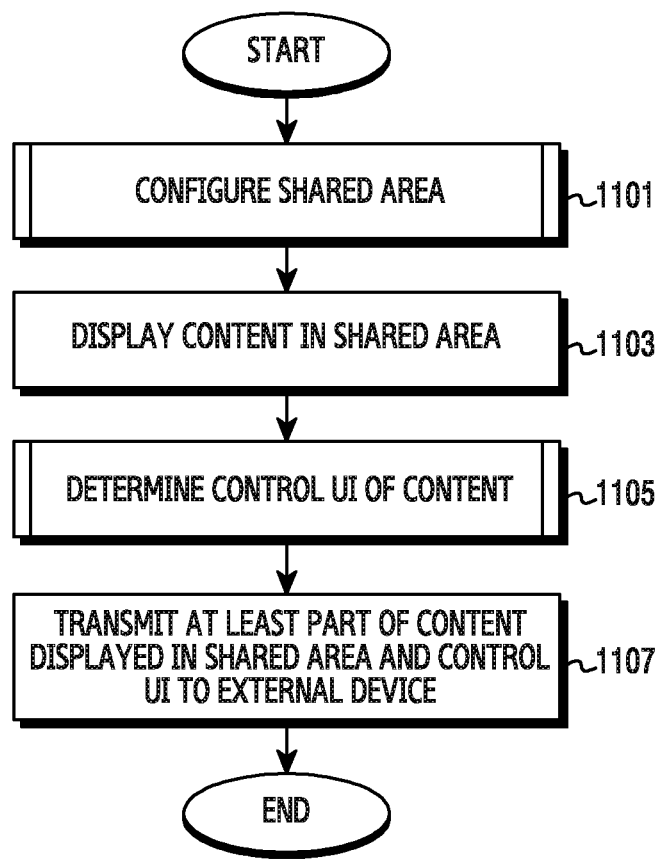
FIG. 11 illustrates a flow diagram of an electronic device for sharing a content and control user interface (UI) information according to an embodiment of the present disclosure.

FIG. 11 illustrates a flow diagram of an electronic device for sharing a content and control UI information according to an embodiment of the present disclosure.

Referring to FIG. 11, in operation 1101, an electronic device (e.g., the electronic device 101 or 400) may configure at least a part of a display (e.g., the display 160) as a shared area. For example, the processor 120 (e.g., the area designation module 410) may configure at least a part of the area of the display 160 as a shared area when an input corresponding to a shared service activation event is detected through the input/output interface 150. For example, the processor 120 may configure at least a part of the area of the display 160 as a shared area when a gesture input corresponding to a shared service activation event is detected through a sensor (not shown). For example, the processor 120 may configure at least a part of the area of the display 160 as a shared area when an external device including a display function is connected through the communication interface 170, as illustrated in the embodiment of FIG. 6.

In operation 1103, the electronic device may display a content to be shared with an external device in at least a part of the area of the display, which is configured as a shared area. For example, the processor 120 may display a content to be shared with an external device in at least a part of the area of the display 160, which is configured as a shared area.

In operation 1105, the electronic device may determine a control UI for controlling a content, based on the characteristics of the content displayed in a shared area. For example, the processor 120 (e.g., image information processing module 420) may determine a control UI for controlling shared information by an external device. In addition, the processor 120 may determine control UIs that are different from each other and correspond to the characteristics of each external device for transmitting shared information. For example, when shared information includes a multiple number of contents, the processor 120 may determine control UIs corresponding to the characteristics of contents, respectively. In addition, the processor 120 may determine a different control UI corresponding to the characteristics of each external device for each content. For example, the characteristics of a content may include at least one of a content type, an application type corresponding to the content, and an operation state of the corresponding application. For example, the characteristics of an external device may include a type, resolution, and location of the external device.

In operation 1107, the electronic device may transmit, to an external device, information on at least a part of a content displayed in a shared area and information on a corresponding control UI. For example, the processor 120 (e.g., image information processing module 420) may control the communication interface 170 to transmit, to an external device, information on a content included in a shared area and information on a control UI corresponding to the corresponding content.

Figure 12:
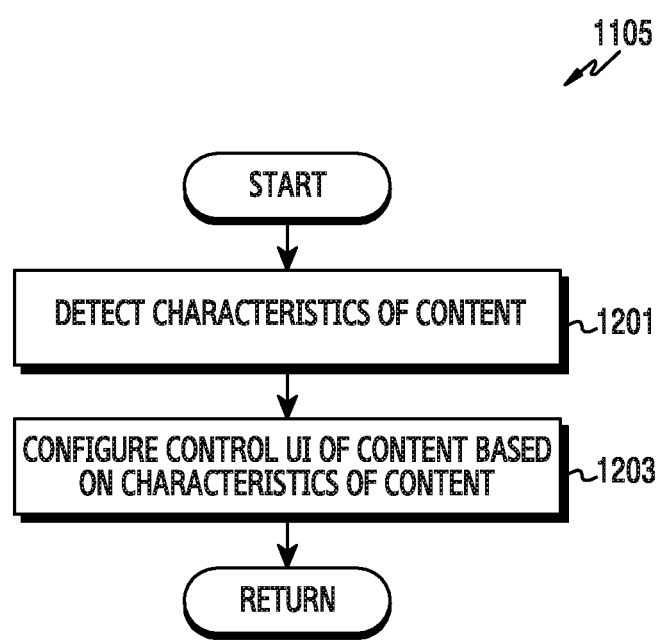
FIG. 12 illustrates a flow diagram of an electronic device for configuring a control UI corresponding to content characteristics according to an embodiment of the present disclosure.

FIG. 12 illustrates a flow diagram of an electronic device for configuring a control UI corresponding to content characteristics according to an embodiment of the present disclosure. The description herein below relates to the operation for determining a control UI, in operation 1105 of FIG. 11.

Referring to FIG. 12, in operation 1201, an electronic device (e.g., the electronic device 101 or 400) may detect the characteristics of a content included in a shared area. For example, the processor 120 (e.g., the operation module 430) may extract, through an application management module of an OS, at least one content characteristic among a type of a content included in a shared area, an application type corresponding to the content, and an operation state of the corresponding application. For example, the processor 120 may extract at least one content characteristic among a type of a content included in a shared area and an operation state of a corresponding application, from the application corresponding to the content included in the shared area.

In operation 1203, the electronic device may configure a control UI of a content, based on the characteristics of the content. For example, the electronic device may configure a different control UI for each content included in a shared area. For example, the processor 120 (e.g., the image information processing module 420) may generate a control UI for controlling a corresponding content to correspond to the characteristics of the content. For example, the processor 120 may update a default control UI to correspond to the characteristics of a content.

According to an embodiment, the electronic device may configure a different control UI corresponding to each application included in a shared area. According to an embodiment, the electronic device may configure a different control UI to correspond to at least one of a menu, access authority, and format of same applications included in a shared area.

Figure 13:
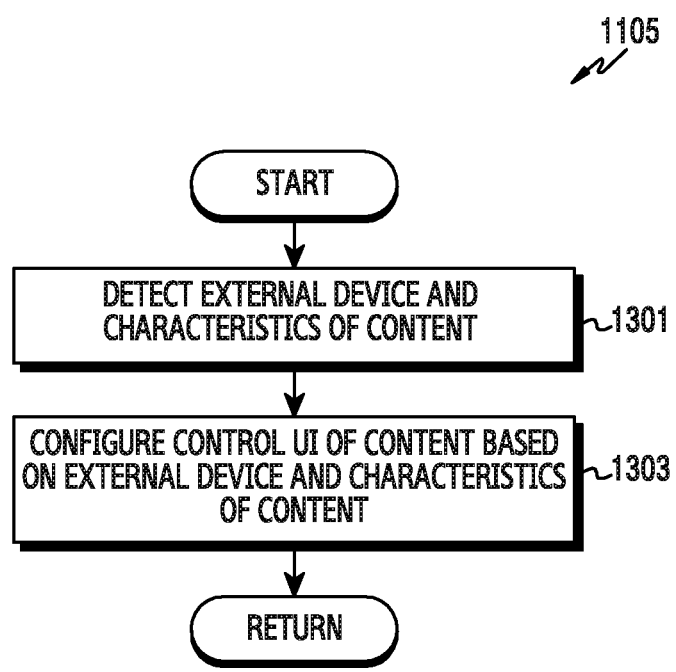
FIG. 13 illustrates a flow diagram of an electronic device for configuring a control UI, based on content characteristics and the characteristics of an external device according to an embodiment of the present disclosure.

FIG. 13 illustrates a flow diagram of an electronic device for configuring a control UI, based on content characteristics and the characteristics of an external device according to an embodiment of the present disclosure. The description herein below relates to the operation for determining a control UI, in operation 1105 of FIG. 11.

Referring to FIG. 13, in operation 1301, an electronic device (e.g., the electronic device 101 or 400) may detect the characteristics of a content included in a shared area and the characteristics of an external device for sharing a content. For example, the processor 120 (e.g., the operation module 430) may extract information on the characteristics of a content included in a shared area through an application management module of an OS or a corresponding application. For example, the processor 120 may acquire the characteristics of an external device through a capability negotiation procedure with the external device.

In operation 1303, the electronic device may configure a control UI of a content for each external device, based on the characteristics of the content and the characteristics of the external device. For example, the processor 120 (e.g., the image information processing module 420) may configure a different control UI for each content included in a shared area, based on the characteristics of the content. Further, the processor 120 may update a control UI for each content to correspond to the characteristics of each external device.

Figure 14:
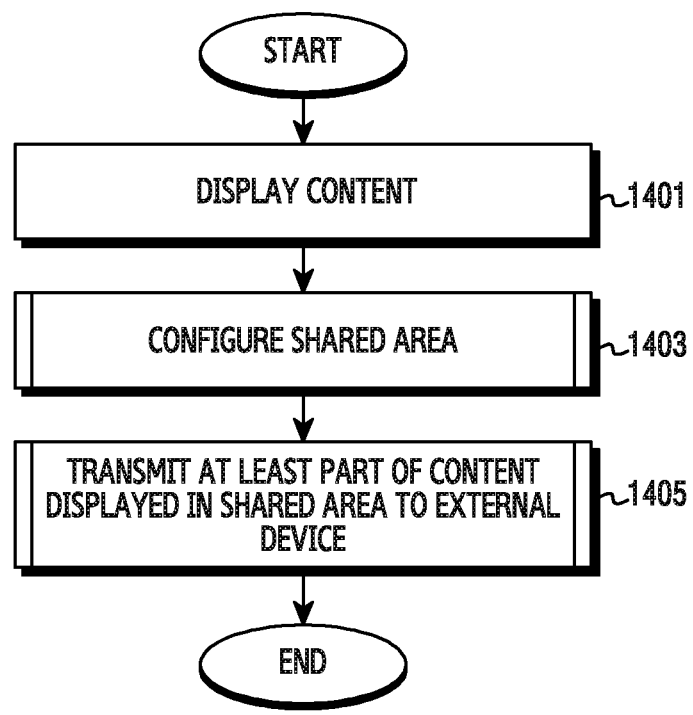
FIG. 14 illustrates a flow diagram of an electronic device for sharing a content displayed in a shared area according to an embodiment of the present disclosure.

FIG. 14 illustrates a flow diagram of an electronic device for sharing a content displayed in a shared area according to an embodiment of the present disclosure.

Referring to FIG. 14, in operation 1401, an electronic device (e.g., the electronic device 101 or 400) may display at least one content on a display (e.g., the display 160). For example, the processor 120 may control the display 160 to display at least one content selected through the input/output interface 150.

In operation 1403, the electronic device may configure at least a part of a display as a shared area. For example, the processor 120 (e.g., the area designation module 410) may configure at least a part of the area of the display 160 as a shared area, in response to an occurrence of a shared service activation event. For example, the processor 120 may detect an occurrence of a shared service activation event, based on input information detected through the input/output interface 150 or a gesture input detected through a sensor (not shown). For example, the processor 120 may configure at least a part of the area of the display 160 as a shared area based on a connection with an external device including a display function, through the communication interface 170.

In operation 1405, the electronic device may transmit, to an external device, information on at least a part of a content displayed in at least a part of the area of a display configured as a shared area. For example, the processor 120 (e.g., the image information processing module 420) may capture at least a part of a content displayed in a shared area, and transmit the same to an external device. For example, the processor 120 may extract information on a content included in a shared area, and transmit the content to an external device. In addition, the processor 120 may perform mapping information on at least a part of a content displayed in a shared area to shared time information, and store the same in the memory 130.

Figure 15:
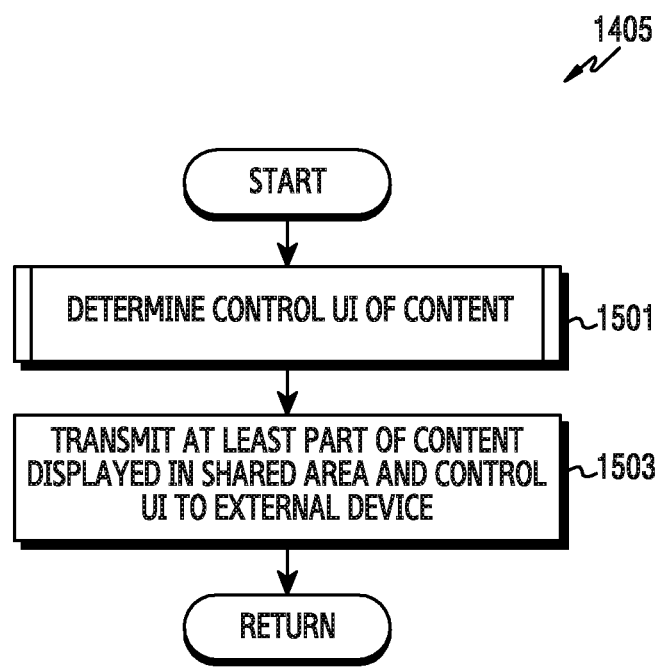
FIG. 15 illustrates a flow diagram of an electronic device for sharing a content displayed in a shared area and a control UI according to an embodiment of the present disclosure.

FIG. 15 illustrates a flow diagram of an electronic device for sharing a content displayed in a shared area and a control UI according to an embodiment of the present disclosure. The description herein below relates to the operation for transmitting, to an external device, information on at least a part of a content displayed in a shared area, in operation 1405 of FIG. 14.

Referring to FIG. 15, in operation 1501, an electronic device (e.g., the electronic device 101 or 400) may determine a control UI corresponding to a content displayed in a shared area. For example, the processor 120 (e.g., the image information processing module 420) may generate a control UI corresponding to each content, based on the characteristics of the content displayed in a shared area, as illustrated in the embodiment of FIG. 12. For example, the processor 120 may generate a control UI corresponding to each content for each external device, based on the characteristics of a content displayed in a shared area and the characteristics of an external device to which the content is transmitted, as illustrated in the embodiment of FIG. 13. For example, a control UI may include fast forward (FF), rewind (REW), play, and pause menus.

In operation 1503, the electronic device may transmit, to an external device, information on at least a part of a content displayed in a shared area and information on a control UI corresponding to the content. For example, the processor 120 (e.g., the image information processing module 420) may control the communication interface 170 to transmit, to an external device, information on a content included in a shared area and information on a control UI corresponding to the content. In addition, the processor 120 may perform mapping information on a content displayed in a shared area and information on a control UI to shared time information, and store the same in the memory 130.

Figure 16A:
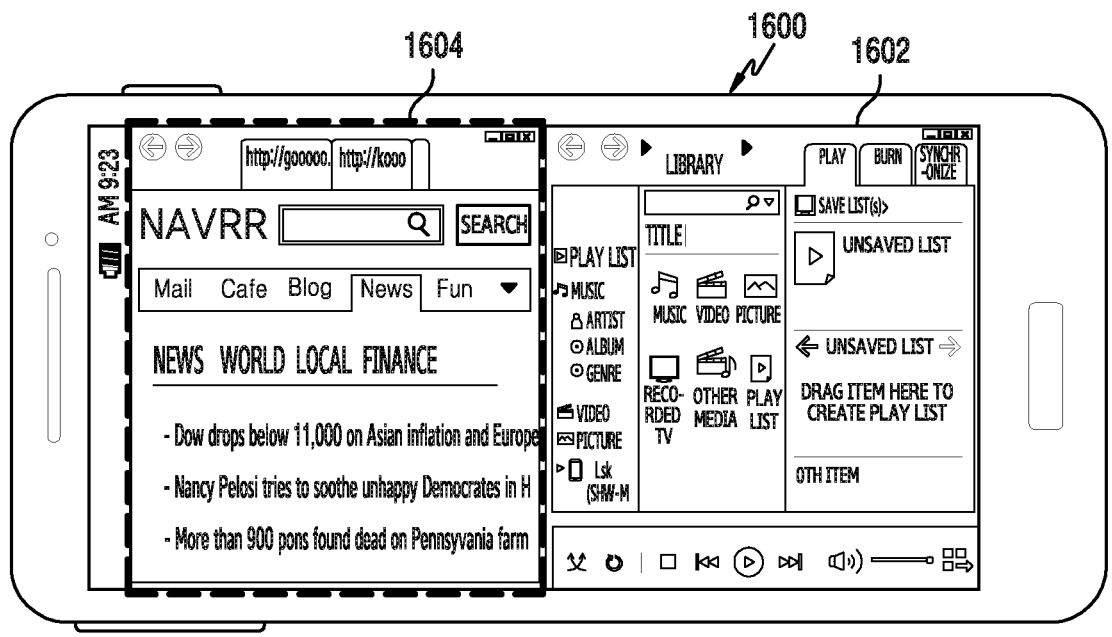
FIGS. 16A and 16B illustrate a screen configuration for sharing at least a part of a content according to various embodiments of the present disclosure.
Figure 16B:
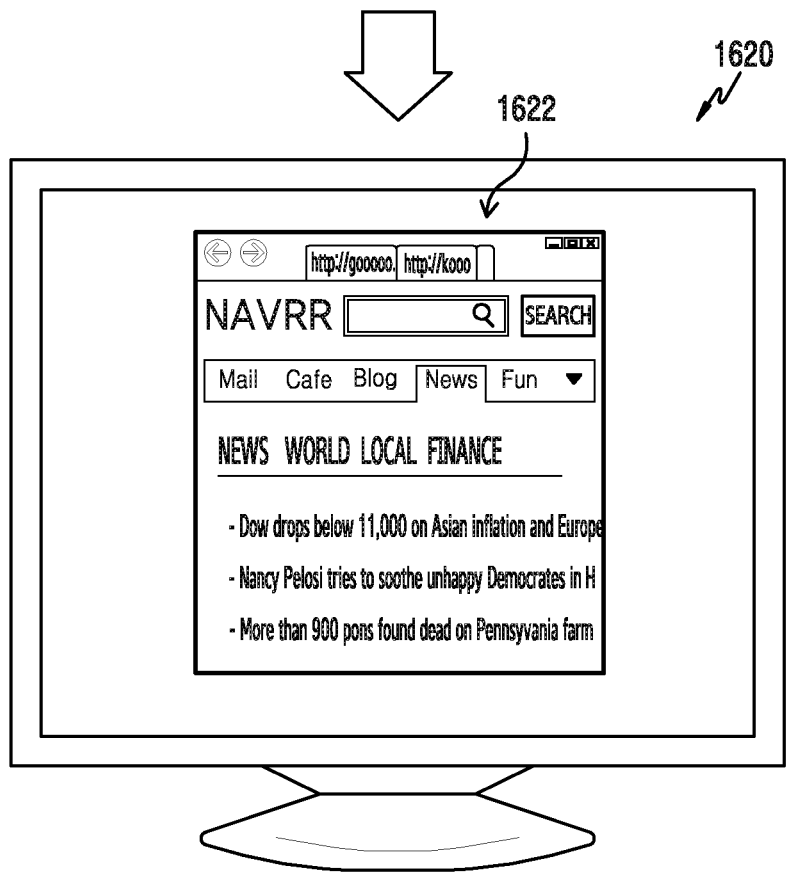

FIGS. 16A and 16B illustrate a screen configuration for sharing at least a part of a content according to various embodiments of the present disclosure. In the description herein below, FIG. 16A illustrates a screen configuration of an electronic device transmitting shared information, and FIG. 16B illustrates a screen configuration of an external device receiving shared information.

Referring to FIG. 16A, an electronic device 1600 (e.g., the electronic device 101 or 400) may display a first content 1602 (e.g., a file management application) and a second content 1604 (e.g., a web page), on a display of the electronic device (e.g., the display 160). When at least a part of the area of the display, on which the second content 1604 is displayed, is configured as a shared area, the electronic device 1600 may extract (or capture) information on the second content 1604 included in the shared area, and transmit the same to an external device.

According to an embodiment, as illustrated in FIG. 16A, the electronic device 1600 may configure at least a part of the display area of the display that displays the second content 1604, as a shared area. The electronic device 1600 may extract (or capture) information on the second content 1604 (e.g., a web page) displayed in the shared area, and transmit the same to an external device.

Referring to FIG. 16B, an external device 1620 (e.g., the electronic device 102, having a display) may display shared information 1622 (e.g., information on the second content) received from the electronic device 1600 in at least a part of the area of a display of the external device 1620. For example, an external device 1620 may correct shared information 1622 to correspond to at least one of the resolution and size of a display, and display the corrected information in at least a part of the area of the display.

Figure 17:
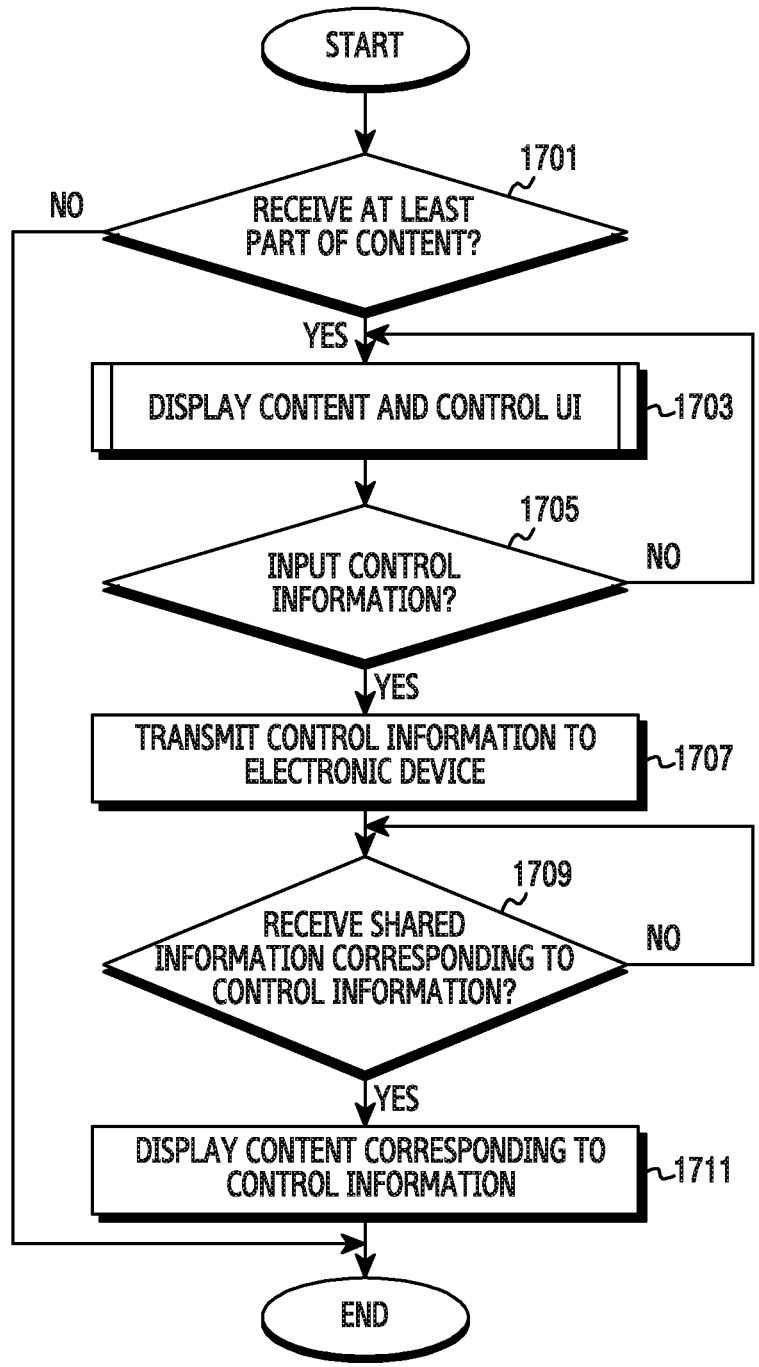
FIG. 17 illustrates a flow diagram of an external device for displaying a shared content according to an embodiment of the present disclosure.

FIG. 17 illustrates a flow diagram of an external device (e.g., the external device 1620 of FIG. 16B) for displaying a shared content according to an embodiment of the present disclosure.

Referring to FIG. 17, in operation 1701, an external device (e.g., the first external device 102) may identify whether information on at least a part of a content is received from an electronic device (e.g., the electronic device 101 or 400). For example, an external device may identify whether shared information is received from an electronic device. For example, shared information may include information in a content and information on a control UI corresponding to the content.

In operation 1703, when shared information is received from the electronic device, the external device may display a content and a control UI, which are included in the shared information, in at least a part of the area of a display. For example, the external device may perform a display such that at least a part of the area of a control UI overlaps with at least a part of the area of a content included in the shared information. For example, the external device may perform a display such that a control UI and a content, which are included in shared information, are adjacent to each other. For example, the external device may display a control UI and a content, which are included in shared information, in different areas.

In operation 1705, the external device may identify whether control information corresponding to a control UI of a content is input. For example, the external device may identify whether input information (e.g., a touch input) corresponding to a display area of a control UI is detected. For example, when the external device is capable of independently controlling a content, the external device may identify whether a rewind menu for the content received from the electronic device is selected. For example, when the external device is capable of independently controlling a content, the external device may identify whether control information for a scroll of the content received from the electronic device is input.

When control information corresponding to a control UI of a content displayed on a display has not been input, the external device may maintain a display for a content and a control UI, which are included in shared information, in operation 1703. According to an embodiment, when other shared information is received from the electronic device, the external device may display a content and a control UI, which are included in the corresponding shared information, in at least a part of the area of a display.

In operation 1707, when control information corresponding to a control UI of a content displayed on a display has been input, the external device may transmit, to the electronic device, control information (e.g., input information) for controlling the content. For example, the external device may transmit, to the electronic device, input information corresponding to a control UI. For example, when the external device is capable of independently controlling a content and has detected a selection of a rewind menu, the external device may transmit control information for a rewind to the electronic device. For example, when the external device is capable of independently controlling a content and has detected an input of control information for a scroll, the external device may transmit control information for a scroll of the content to the electronic device.

In operation 1709, the external device may identify whether previous shared information corresponding to control information is received from the electronic device.

In operation 1711, when previous shared information corresponding to control information is received, the external device may display a content and a control UI, which are included in previous shared information provided by the electronic device, in at least a part of the area of a display. For example, the external device may update a content displayed in at least a part of the area of a display, using a content included in previous shared information.

According to an embodiment, when an external device does not include an input interface (e.g., a touch screen), the electronic device may display, in a display of the electronic device, a control UI of the external device corresponding to a content displayed in a display of the external device. When input information (e.g., an REW input) is detected through a control UI of an external device, the electronic device may transmit a content (e.g., a content corresponding to an REW input) corresponding to input information to the external device. In this case, the electronic device may maintain the content displayed on the display of the electronic device regardless input information detected through the control UI of the external device.

Figure 18:
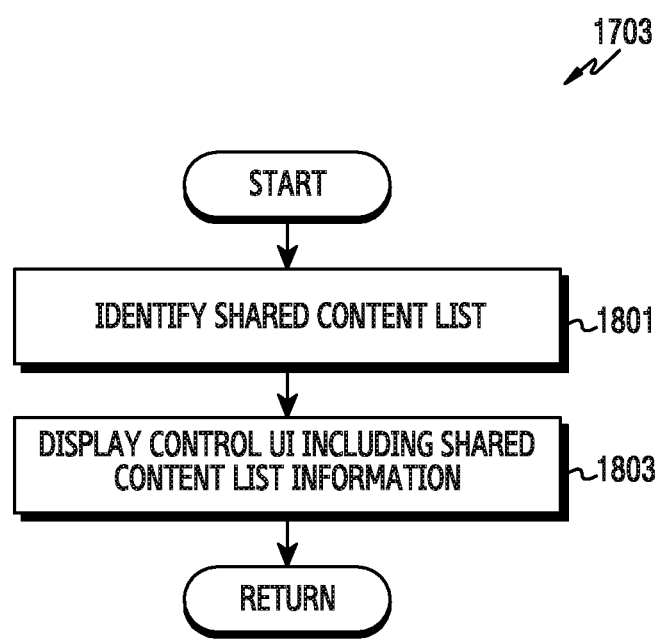
FIG. 18 illustrates a flow diagram of an external device for displaying a control UI corresponding to a shared content according to an embodiment of the present disclosure.

FIG. 18 illustrates a flow diagram of an external device for displaying a control UI corresponding to a shared content according to an embodiment of the present disclosure. The description herein below relates to the operation for displaying a content and a control UI, in operation 1703 of FIG. 17, with reference to the screen configuration in FIG. 19, which illustrates a screen configuration of a control UI corresponding to a shared content displayed in an external device according to an embodiment of the present disclosure.

Referring to FIG. 18, in operation 1801, an external device (e.g., the first external electronic device 102) may identify a content list received from an electronic device (e.g., the electronic device 101 or 400). For example, the external device may identify a content list including a content received from the electronic device, an application corresponding to the content, and shared time point information of the content.

Figure 19:
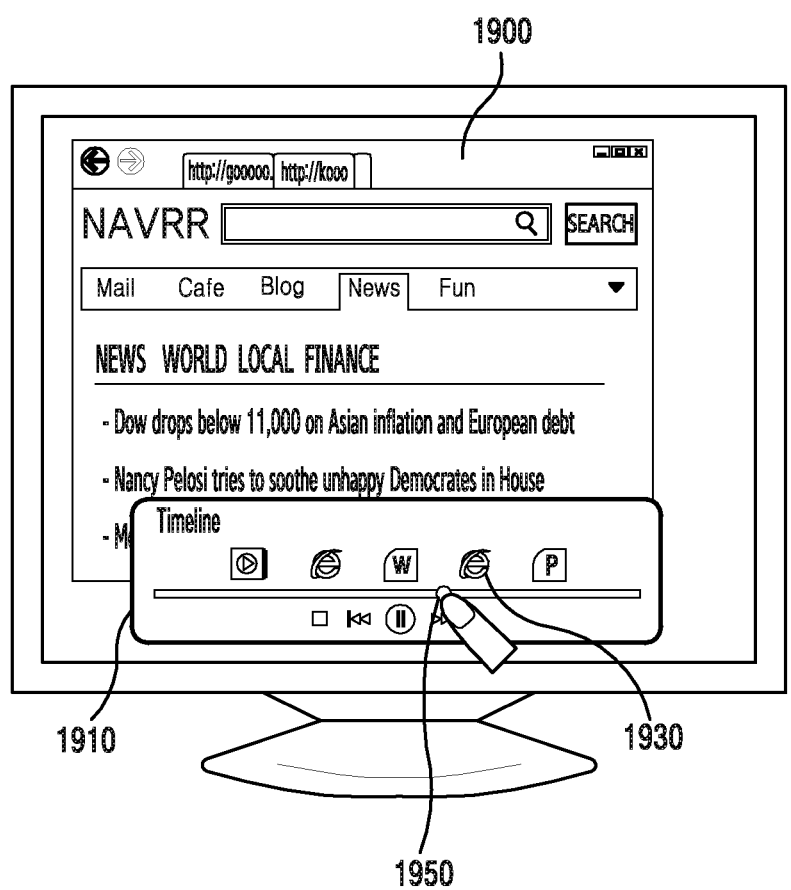
FIG. 19 illustrates a screen configuration of a control UI corresponding to a shared content displayed in an external device according to an embodiment of the present disclosure.

In operation 1803, the external device may display control UI information included in a content list (or content list information), in at least a part of the area of a display. For example, when the external device sequentially shares contents of multiple applications with the electronic device, the external device may display, in at least a part of the area of a display, a control UI 1910 including corresponding application information 1930 in the order of shared time points of a content with the electronic device, as illustrated in the embodiment of FIG. 19. The external device may display a content received from the electronic device in at least a part of the area 1900 of a display, in operation 1701 of FIG. 17.

According to an embodiment, when input information on a scroll bar 1950 of a control UI 1910 displayed in a display is detected, the external device may transmit the corresponding input information to the electronic device and receive information on a content corresponding to input information of the scroll bar. The external device may display information on a content corresponding to input information of the scroll bar received from the electronic device in at least a part of the area 1900 of a display.

According to an embodiment, the external device may receive, from the electronic device, whole information of a content at least a part of which is included in a shared area. Accordingly, the external device may search, in the corresponding content, for at least a part of other information (e.g., information of other time interval) that is not included in the shared information, through control information.

According to an embodiment, when information on an input for a search of another part that is not included in a shared area of a content at least a part of which is shared with the electronic device is detected, the external device may transmit corresponding input information (control information) to the electronic device. The electronic device may extract content information that is not included in the shared area but corresponds to input information received from an external device, and transmit the extracted content information to the external device. The external device may display content information (information of at least another part that is not included in the shared area) corresponding to input information received from the electronic device.

Figure 20:
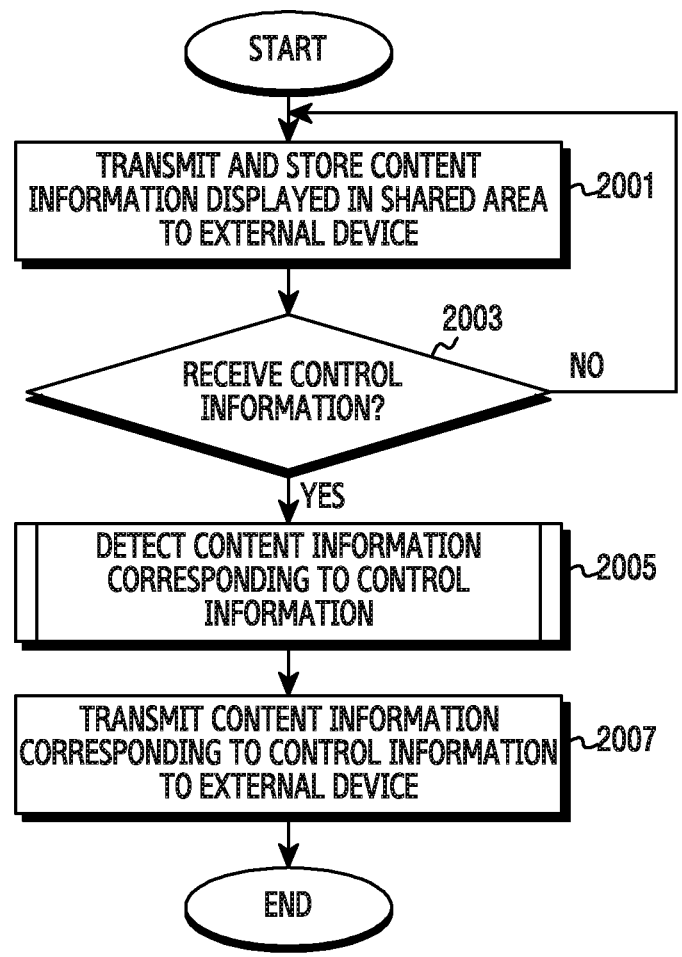
FIG. 20 illustrates a flow diagram of an electronic device for providing a shared content according to an embodiment of the present disclosure.

FIG. 20 illustrates a flow diagram of an electronic device for providing a shared content according to an embodiment of the present disclosure. The description herein below relates to an operation of the electronic device, corresponding to the operation of the external device in FIG. 17.

Referring to FIG. 20, in operation 2001, an electronic device (e.g., the electronic device 101 or 400) may transmit shared information including information on a content displayed in a shared area to an external device (e.g., the first external electronic device 102). The electronic device may store shared information transmitted to the external device, in a memory (e.g., the memory 130) of the electronic device. For example, the processor 120 (e.g., the image information processing module 420) may control the communication interface 170 to transmit shared information to the external device, as illustrated in the embodiments of FIG. 5, FIG. 11, or FIG. 14.

In operation 2003, the electronic device may identify whether control information is received from an external device. For example, control information may include input information corresponding to a control UI transmitted to an external device.

In operation 2001, when control information is not received from an external device, the electronic device may extract (or capture) shared information including information on a content displayed in a shared area, and transmit the extracted shared information to the external device.

In operation 2005, when control information is received from an external device, the electronic device may detect information on a content corresponding to control information among pieces of shared information stored in the memory. For example, the processor 120 (e.g., the image information processing module 420) may extract shared information of a time point corresponding to control information among pieces of shared information stored in the memory 130. The processor 120 may detect content information having been transmitted to the external device at a time point corresponding to control information, in shared information extracted in the memory 130. For example, the processor 120 may detect execution information of an application having been driven at a time point corresponding to control information.

In operation 2007, the electronic device may transmit information on a content corresponding to control information to an external device. For example, the processor 120 (e.g., the image information processing module 420) may control the communication interface 170 to transmit, to an external device, content information of a time point corresponding to control information extracted in the memory 130.

According to an embodiment, the electronic device may display content information of a time point corresponding to control information in at least a part of the area (e.g., a shared area) of a display. For example, the processor 120 may update display information of a shared area, using content information of a time point corresponding to control information extracted in the memory 130.

According to various embodiments of the present disclosure, when input information for content sharing is detected through an input/output interface (e.g., the input/output interface 150 in FIG. 1), the electronic device may detect information on a content corresponding input information among pieces of shared information stored in the memory, and transmit the detected information to an external device.

Figure 21:
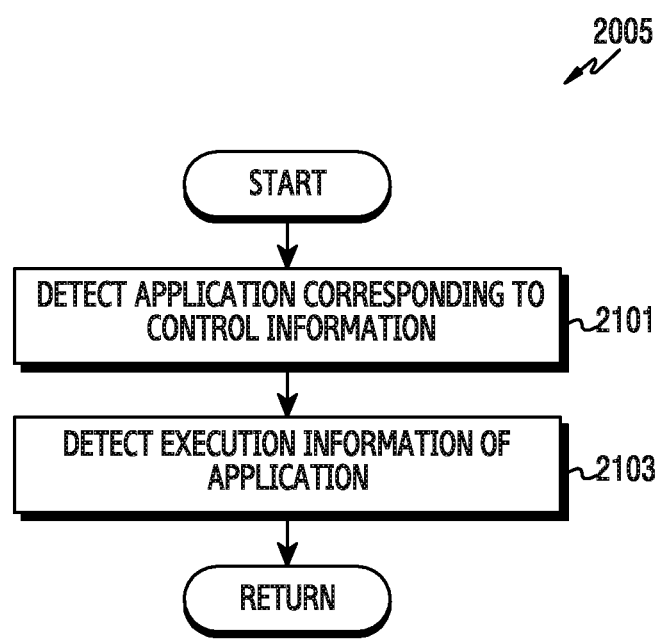
FIG. 21 illustrates a flow diagram of an electronic device for detecting application execution information corresponding to control information according to an embodiment of the present disclosure.

FIG. 21 illustrates a flow diagram of an electronic device for detecting application execution information corresponding to control information according to an embodiment of the present disclosure. The description herein below relates to the operation for detecting content information corresponding to control information, in operation 2005 of FIG. 20.

Referring to FIG. 21, in operation 2101, an electronic device (e.g., the electronic device 101 or 400) may detect application information corresponding to control information for content sharing. For example, the processor 120 (e.g., the image information processing module 420) may extract shared information of a time point corresponding to control information among pieces of shared information stored in the memory 130. The processor 120 may detect information on an application driven at a time point corresponding to control information included in shared information. For example, control information on content sharing may be received from an external device, or received through the input/output interface 150 of the electronic device. For example, control information on content sharing received from an external device may include input information corresponding to a control UI transmitted to the external device.

In operation 2103, the electronic device may detect execution information of an application that corresponds to a time point corresponding to control information. For example, the processor 120 (e.g., the operation module 430) may detect content information corresponding to execution of an application, in shared information of a time point corresponding to control information.

Figure 22:
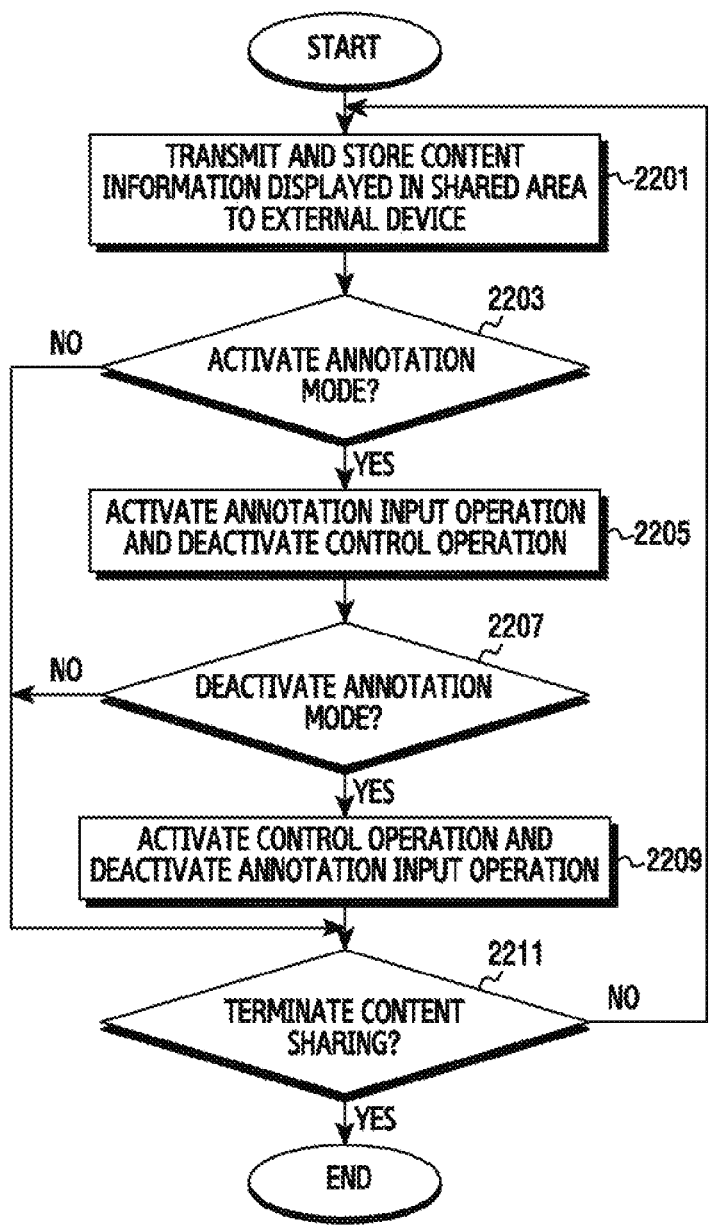
FIG. 22 illustrates a flow diagram of an electronic device for selectively performing an operation corresponding to input information of the shared content according to an embodiment of the present disclosure.

FIG. 22 illustrates a flow diagram of an electronic device for selectively performing an operation corresponding to input information of the shared content according to an embodiment of the present disclosure.

Referring to FIG. 22, in operation 2201, an electronic device (e.g., the electronic device 101 or 400) may transmit, to an external device (e.g., the first external electronic device 102), and store shared information including information on a content displayed in a shared area. For example, the processor 120 (e.g., the image information processing module 420) may control the communication interface 170 to transmit shared information to an external device, as illustrated in the embodiment of FIG. 5, FIG. 11, or FIG. 14.

In operation 2203, the electronic device may identify whether an annotation mode for a shared area is activated. For example, the processor 120 (e.g., the image information processing module 420) may identify whether an input of selecting an icon corresponding to activation of an annotation mode is detected through the input/output interface 150. For example, the processor 120 may identify whether a gesture input corresponding to activation of an annotation mode is detected through a sensor (not shown).

The electronic device may identify whether content sharing is terminated when an annotation mode for a shared area is not activated, in operation 2211.

In operation 2205, when an annotation mode for a shared area is activated, the electronic device may activate an annotation input operation, and deactivate a control operation. For example, the processor 120 (e.g., the image information processing module 420) may activate a pen touch input operation by a touch pen for inputting an annotation, and deactivate a mouse input and hand touch input for a control operation.

In operation 2207, the electronic device may identify whether an annotation mode for a shared area is deactivated. For example, the processor 120 (e.g., the image information processing module 420) may identify whether an input for selecting an icon corresponding to deactivation of an annotation mode is detected, through the input/output interface 150. For example, the processor 120 may identify whether a gesture input corresponding to deactivation of an annotation mode is detected through a sensor (not shown).

The electronic device may identify whether content sharing is terminated when an annotation mode for a shared area is not deactivated, in operation 2211.

In operation 2209, when an annotation mode for a shared area is deactivated, the electronic device may deactivate an annotation input operation, and activate a control operation. For example, the processor 120 (e.g., the image information processing module 420) may activate a mouse input and hand touch input for a control operation, and deactivate a pen touch input operation by a touch pen for inputting an annotation.

In operation 2211, the electronic device may identify whether content sharing is terminated. For example, the processor 120 (e.g., the image information processing module 420) may identify whether an input corresponding to a shared service termination event is detected through the input/output interface 150. For example, the processor 120 may identify whether a gesture input corresponding to a shared service termination event is detected through a sensor (not shown). For example, the processor 120 may identify whether a communication connection with an external device is disconnected.

When content sharing has not been terminated, the electronic device may transmit, to an external device, and store shared information including information on a next content displayed in a shared area, in operation 2201.

According to various embodiments of the present disclosure, an operation method of an electronic device may include the operations of: displaying a content on a display of the electronic device; selecting at least a part of the area of the display; and transmitting at least a part of the content displayed in at least a part of the area of the display to an external device such that the transmitted content is controlled, through a display of the external device, independently of the content displayed on the display.

According to various embodiments, an operation for transmitting a user interface for controlling the transmitted content to the external electronic device may be further included.

According to various embodiments, the user interface may be determined based on at least one of a type of the content, a type of an application corresponding to the content, and an operation state of the application.

According to various embodiments, an operation for storing at least a part of a content displayed in at least a part of the area of the display may be further included.

According to various embodiments, an operation for storing at least a part of the content may include an operation for associating at least a part of a content displayed in at least a part of the area of the display with a time point of transmission to the external electronic device, and storing the same.

According to various embodiments, when control information is received, an operation for detecting at least a part of a pre-stored content corresponding to the control information, and an operation for transmitting, to the external electronic device, at least a part of a content corresponding to the control information may be further included.

An electronic device and an operation method therefor according to various embodiments may transmit at least some of information of a content displayed in a shared area to an external device, so as to share user-desired information with the external device.

An electronic device and an operation method therefor according to various embodiments may store at least some of information of a content transmitted to an external device for sharing, so as to control shared information displayed at least one of the electronic device and the external device, based on input information provided from the external device.

An electronic device and an operation method therefor according to various embodiments may selectively activate an annotation input operation and a control operation, based on a shared mode so that a user's input error may be prevented at the time of content information sharing with at least one external device for a presentation, a meeting, and so on.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a compact disc read only memory (CD-ROM) and a DVD), magneto-optical media (for example, a floptical disk), a hardware device (for example, a read only memory (ROM), a random access memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display comprising a display area;
a communication interface; and
a processor configured to:
 select at least a part of the display area,
 control the display to display a content in the display area,
 determine a control user interface (UI) for controlling at least a part of the content, which is displayed in at least the part of the display area, based at least in part on at least one of a type of the content, which is displayed, a type of an application corresponding to the content, which is displayed, or an operation state of the application, and
 control the communication interface to transmit at least the part of the content, which is displayed in at least the part of the display area, and the determined control UI to an external electronic device such that the at least the part of the content is controllable, through the control UI displayed on a display of the external electronic device, independently of the content being displayed on the display of the electronic device,
wherein the processor is further configured to:
 determine the control UI, further based on at least one of a type, a resolution, or a location of the external electronic device.

2. The electronic device of claim 1, further comprising:
a memory,
wherein the processor is further configured to store, in the memory, at least the part of the content which is displayed.

3. The electronic device of claim 2, wherein the processor is further configured to change a period of storing the content in the memory, based on at least one of the type of the content, which is displayed, the type of the application corresponding to the content, which is displayed, or the operation state of the application.

4. The electronic device of claim 2, wherein the memory is configured to associate and store at least the part of the content, which is displayed, with a time point of transmission to the external electronic device.

5. The electronic device of claim 2, wherein, in response to receiving control information from the external device, the processor is further configured to:
 detect at least the part of the content corresponding to the control information in the memory, and
 control the communication interface to transmit at least the part of the content corresponding to the control information to the external electronic device.

6. An electronic device comprising:
a display comprising a display area;
a communication interface; and
a processor configured to:
 control the display to display a content,
 select at least a part of the display area,
 determine a control user interface (UI) for controlling at least a part of the content, which is displayed in the selected part of the display area, based at least in part on at least one of a type of the content, which is displayed, a type of an application corresponding to the content, which is displayed, or an operation state of the application, and
 control the communication interface to transmit at least the part of the content, which is displayed in the selected part of the display area, and the determined control UI to an external electronic device such that at least the part of the content, which is transmitted, is controllable, through the control UI displayed on a display of the external electronic device, independently of the content being displayed on the display of the electronic device,
wherein the processor is further configured to:
 determine the control UI, further based on at least one of a type, a resolution, or a location of the external electronic device.

7. The electronic device of claim 6, further comprising:
a memory,
wherein the processor is further configured to store, in the memory, at least the part of the content displayed in at least the part of the display area.

8. The electronic device of claim 7, wherein the memory is configured to:
 associate and store at least the part of the content displayed in at least the part of the display area with a time point of transmission to the external electronic device.

9. The electronic device of claim 7, wherein, in response to receiving control information from the external electronic device through the communication interface, the processor is further configured to:
 detect the part of the content corresponding to the control information in the memory, and
 control the communication interface to transmit the part of the content corresponding to the control information to the external electronic device.

10. An operation method of an electronic device, the method comprising:
 displaying a content on a display area of a display of the electronic device;
 selecting at least a part of the display area;
 determining a control user interface (UI) for controlling at least a part of the content, which is displayed in the selected at least the part of the display area, based at least in part on at least one of a type of the content, which is displayed, a type of an application corresponding to the content, which is displayed, or an operation state of the application; and
 transmitting at least the part of the content, which is displayed in the part of the display area, and the determined control UI to an external electronic device such that at least the part of the content, which is transmitted, is controllable, through the control UI displayed on a display of the external electronic device, independently of the content which is simultaneously displayed on the display of the electronic device,
wherein determining the control UI comprises:
 determining the control UI, further based on at least one of a type, a resolution, or a location of the external electronic device.

11. The operation method of claim 10, further comprising storing, in a memory, at least the part of the content displayed in at least the part of the display area.

12. The operation method of claim 11, wherein the storing of at least the part of the content comprises:
 associating and storing at least the part of the content displayed in at least the part of the area of the display with a time point of transmission to the external electronic device.

13. The operation method of claim 11, further comprising:
 detecting, in response to receiving control information, at least the part of the content corresponding to the control information; and transmitting at least the part of the content corresponding to the control information to the external electronic device.

14. The electronic device of claim 1,
wherein the control UI controls a part of the content which is displayed on the external electronic device without controlling a part of the content which is displayed on the electronic device, and
wherein the control UI comprises one or more of a fast forward (FF) command, a rewind (REW) command, a play command, or a pause command to control the part of the content which is displayed on the external electronic device.

\* \* \* \* \*